Aug. 1, 1961  A. W. DAUBENDICK  2,994,428
SORTING APPARATUS
Filed April 28, 1958  11 Sheets-Sheet 1
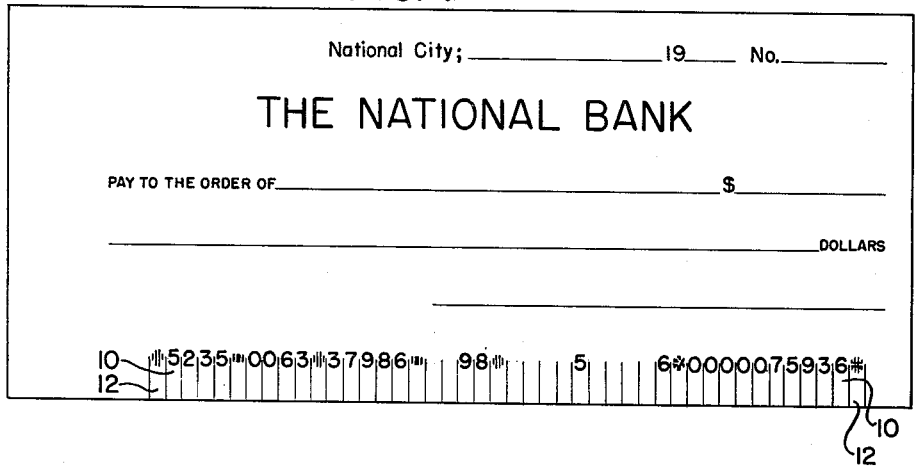
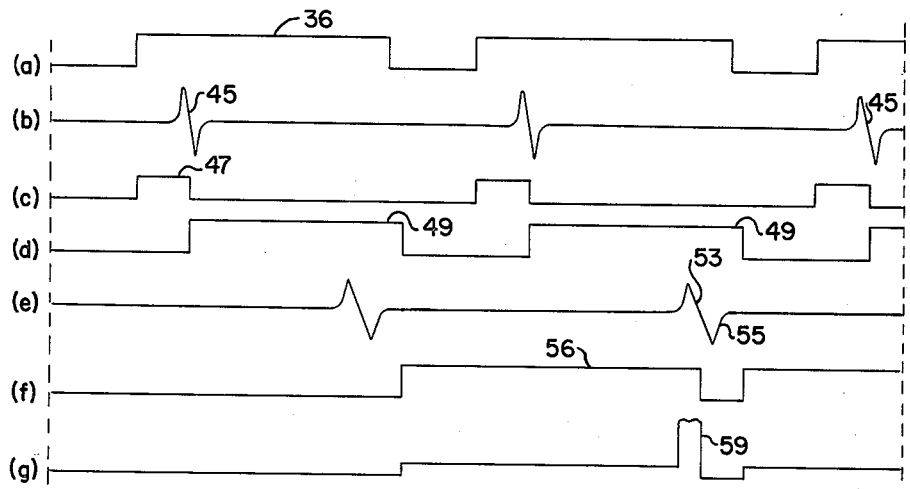
INVENTOR
ALLEN W. DAUBENDICK
BY
HIS ATTORNEYS

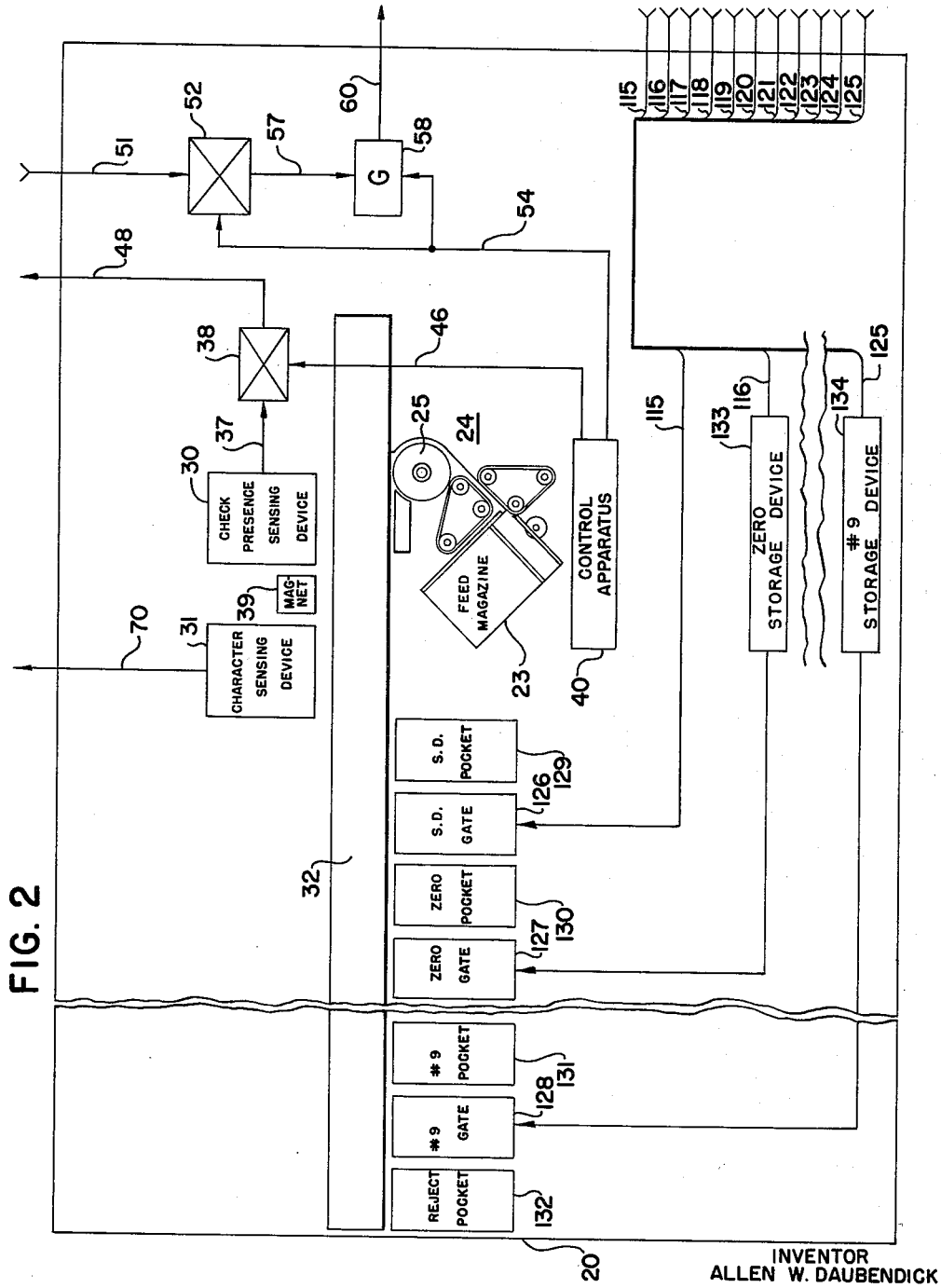

Aug. 1, 1961 A. W. DAUBENDICK 2,994,428
SORTING APPARATUS
Filed April 28, 1958 11 Sheets-Sheet 3

INVENTOR
ALLEN W. DAUBENDICK
BY Louis A Kline
John J. Callahan
HIS ATTORNEYS

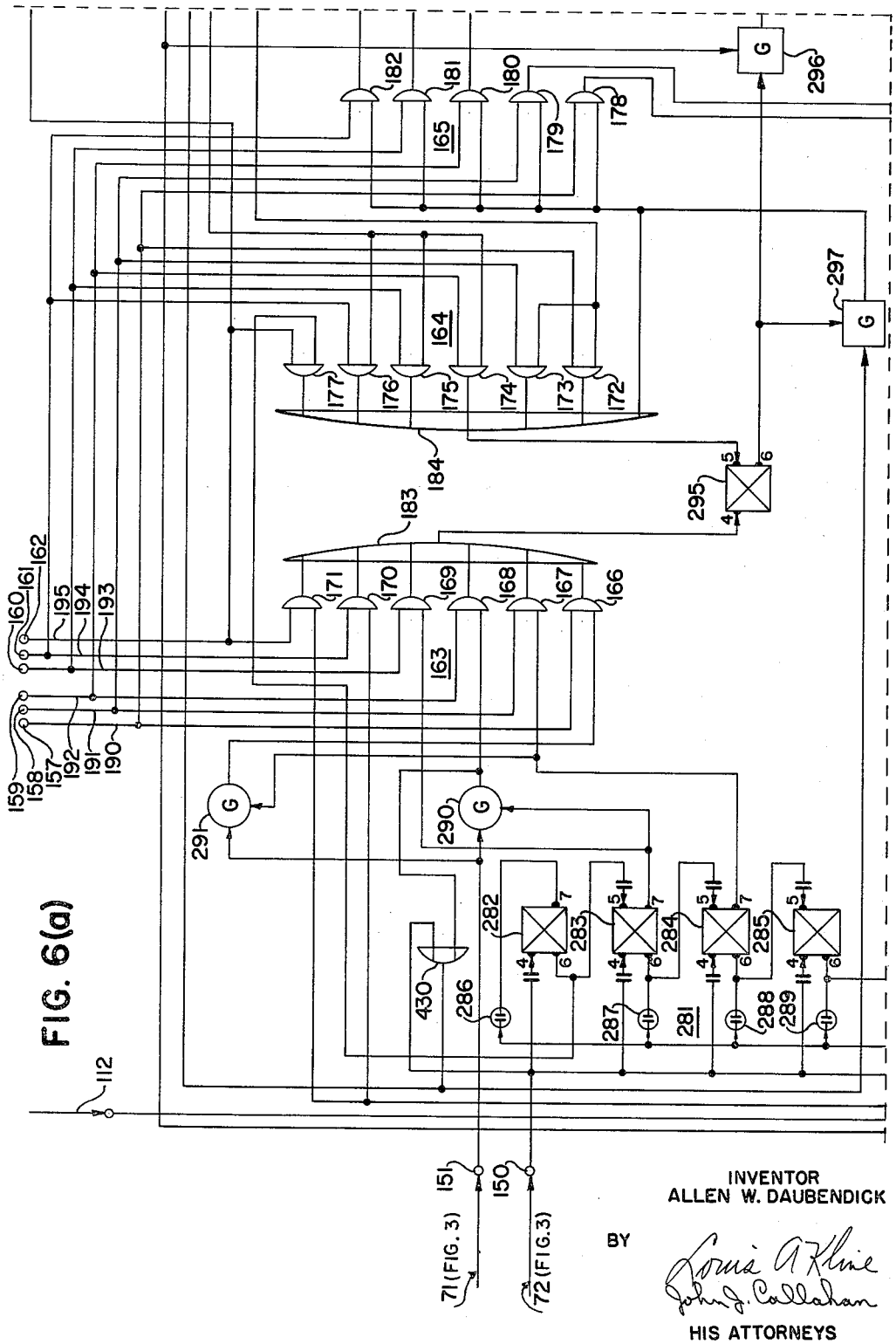

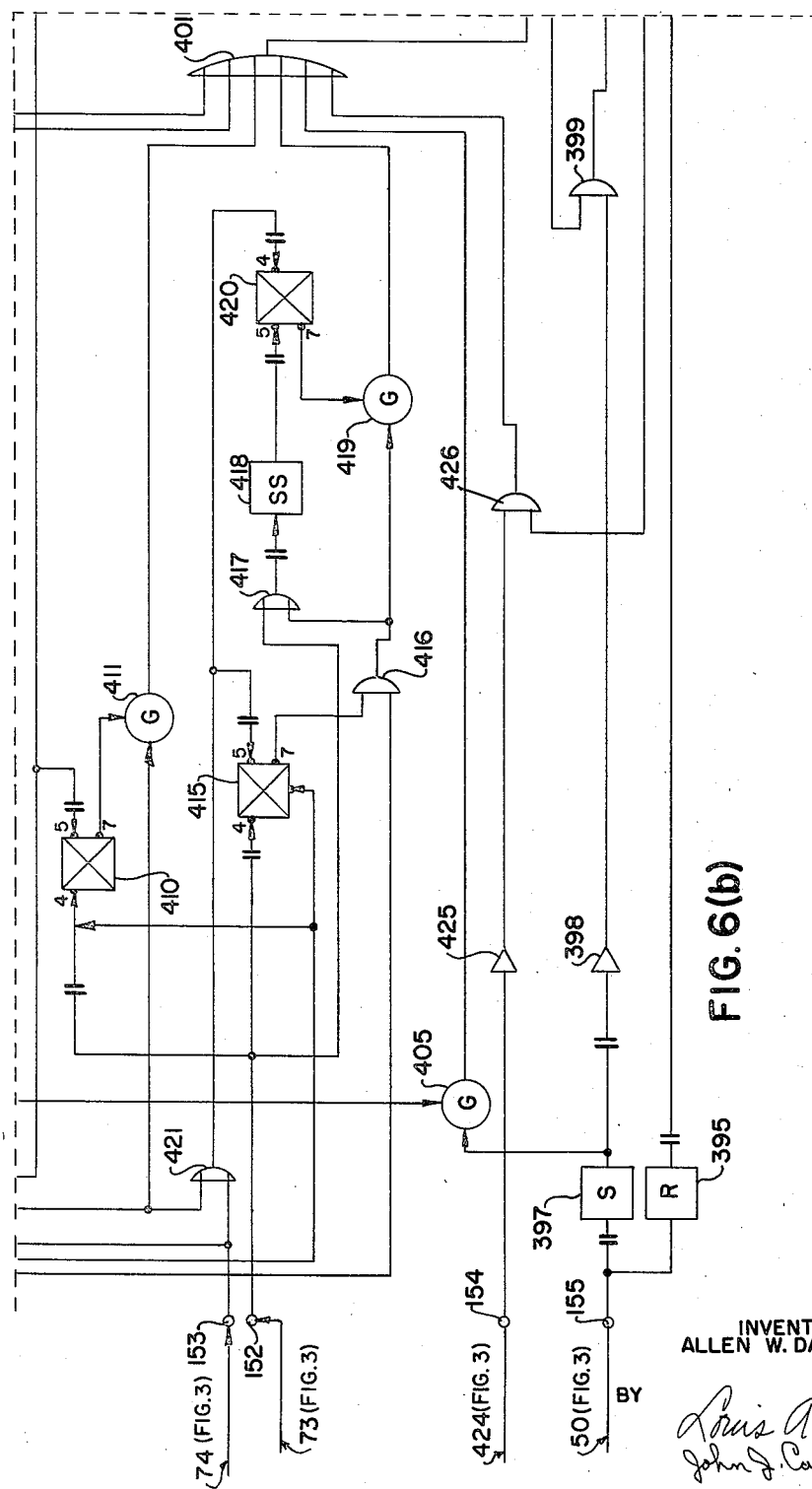

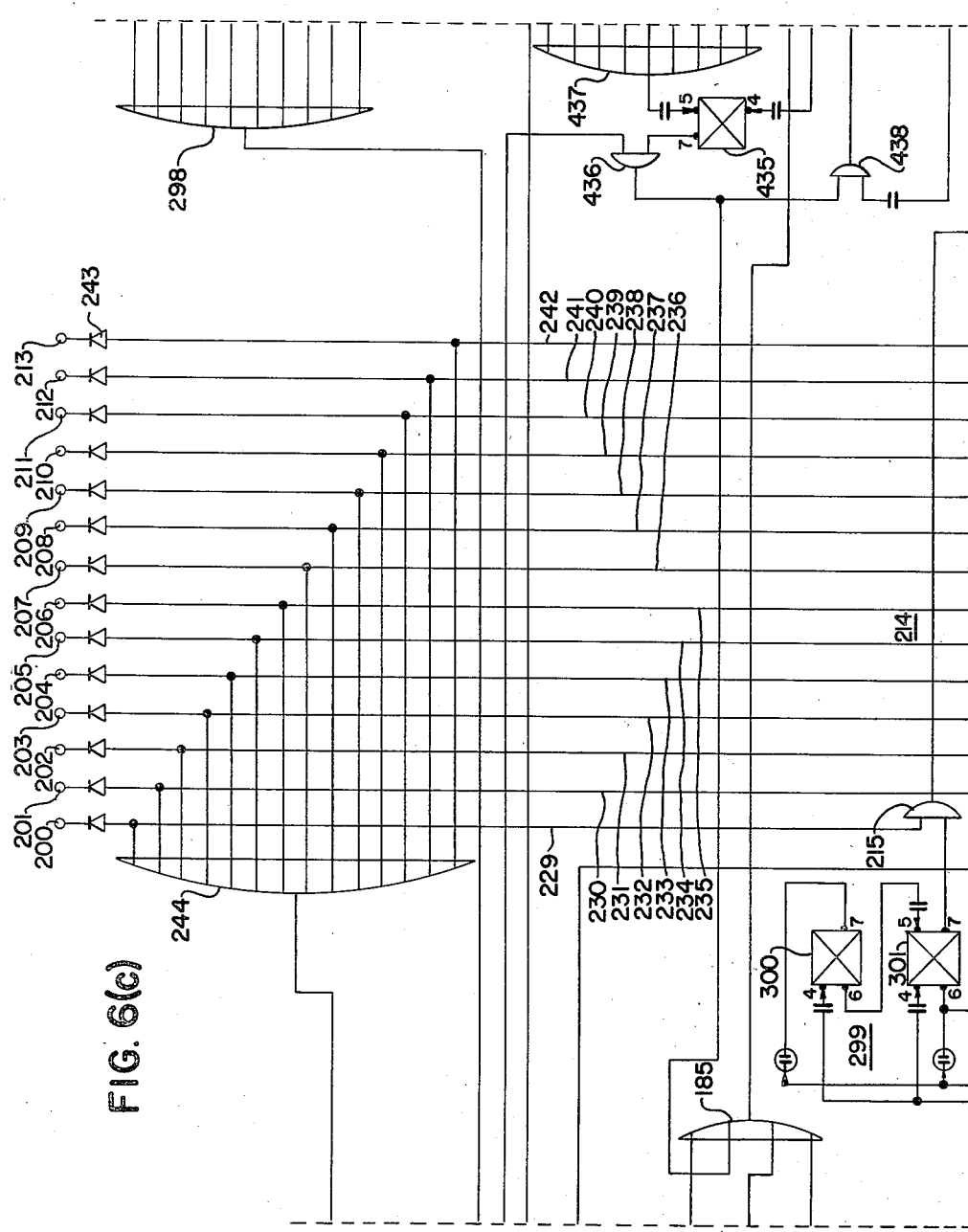

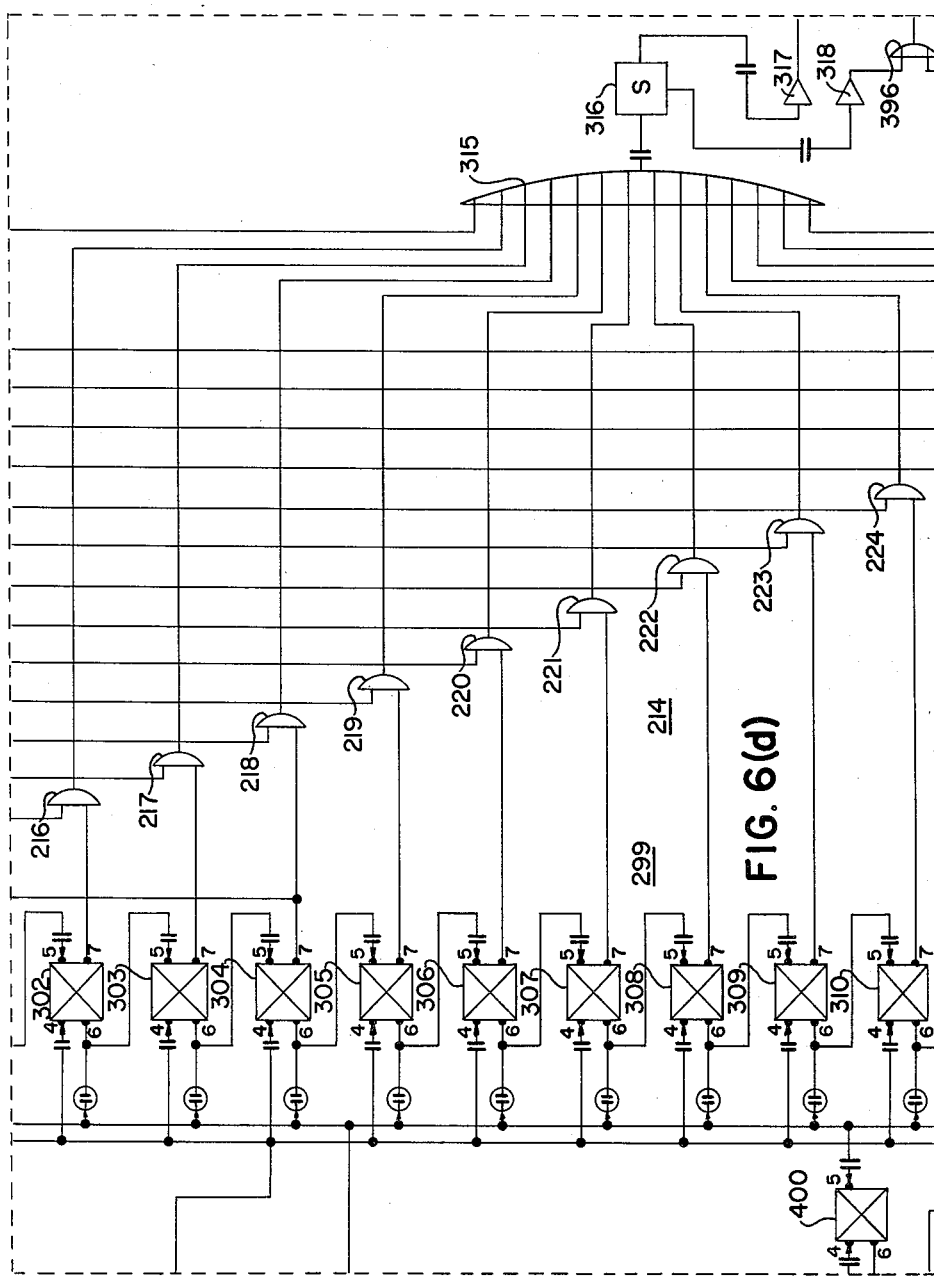

Aug. 1, 1961  A. W. DAUBENDICK  2,994,428
SORTING APPARATUS
Filed April 28, 1958  11 Sheets-Sheet 8
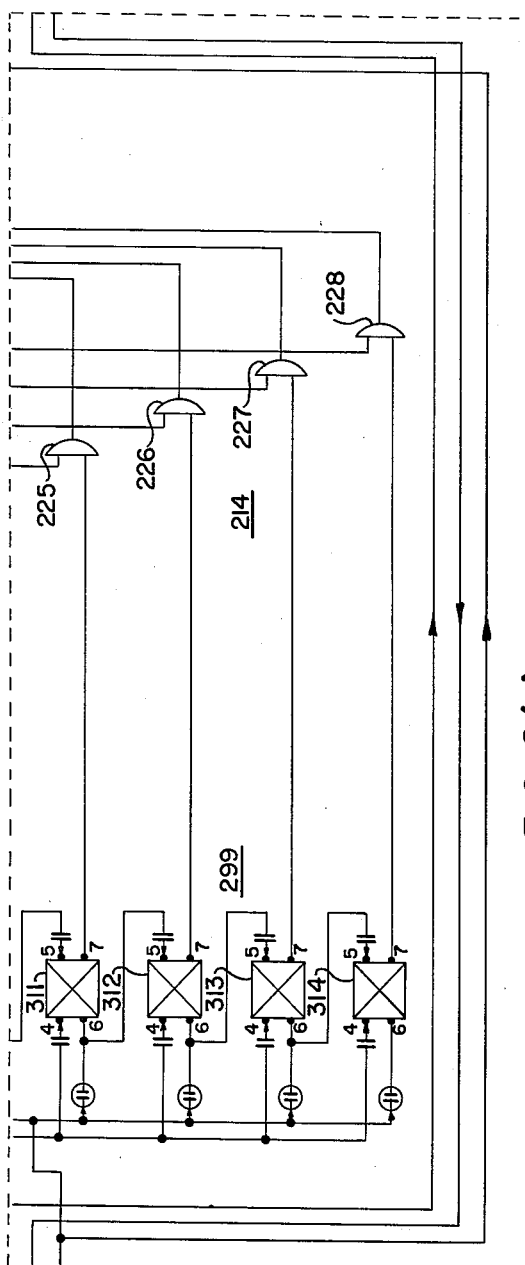
INVENTOR
ALLEN W. DAUBENDICK
BY
HIS ATTORNEYS

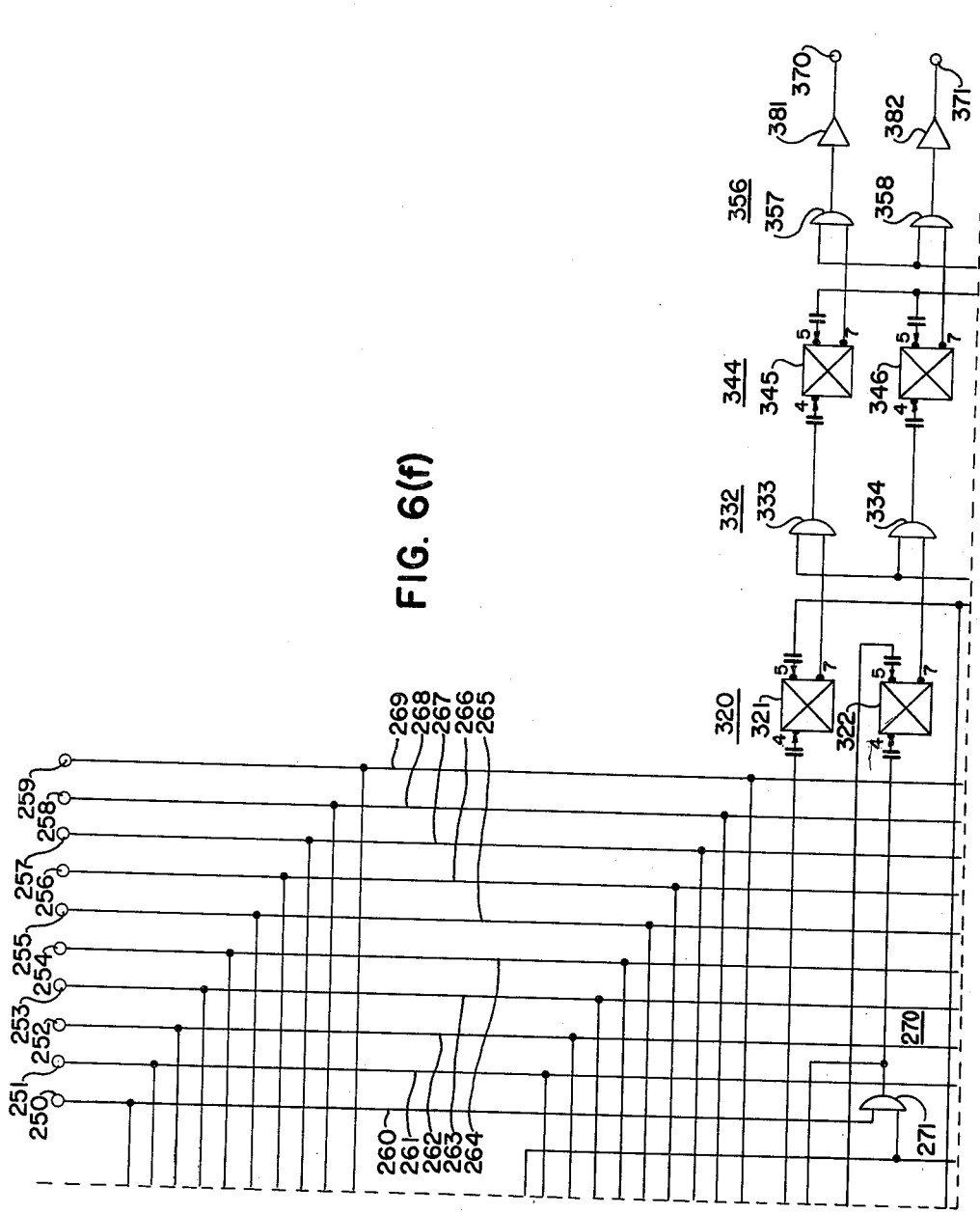

INVENTOR
ALLEN W. DAUBENDICK

HIS ATTORNEYS

Aug. 1, 1961  A. W. DAUBENDICK  2,994,428
SORTING APPARATUS
Filed April 28, 1958  11 Sheets-Sheet 11
FIG. 7
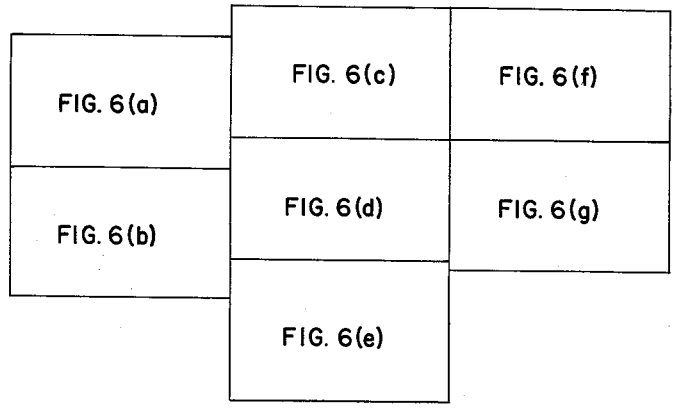
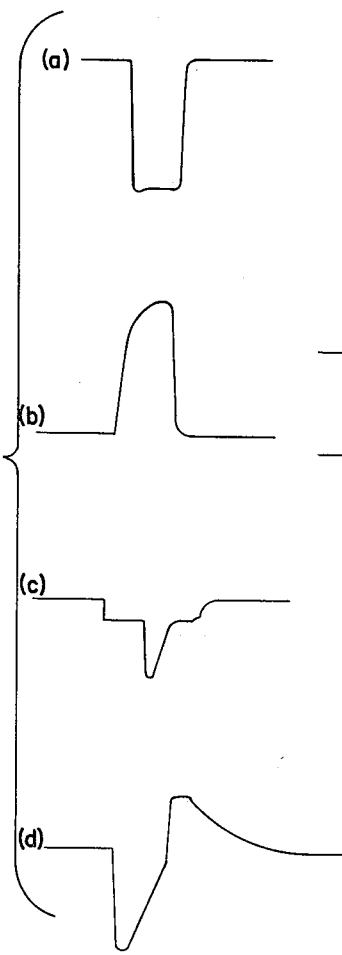
FIG. 9
FIG. 8
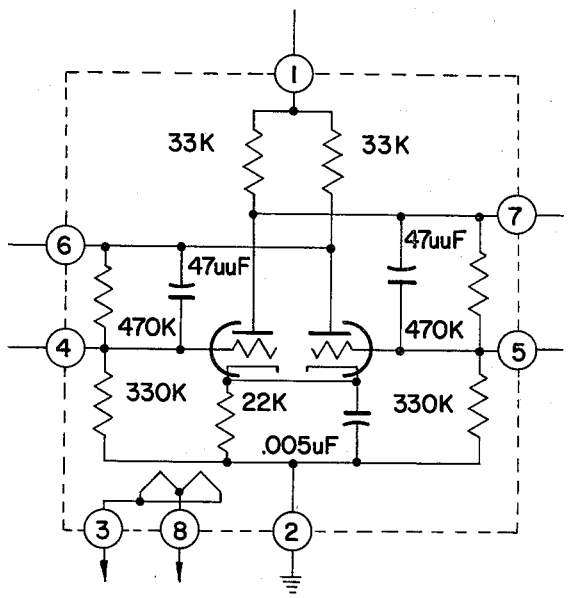
INVENTOR
ALLEN W. DAUBENDICK
BY
*Louis A Kline*
*John J. Callahan*
HIS ATTORNEYS nited States Patent Office 2,994,428
Patented Aug. 1, 1961

2,994,428
SORTING APPARATUS
Allen W. Daubendick, Dayton, Ohio, assignor to The National Cash Register Company, Dayton, Ohio, a corporation of Maryland
Filed Apr. 28, 1958, Ser. No. 731,405
22 Claims. (Cl. 209—111.5)

This invention relates generally to sorting apparatus. More particularly, the invention relates to new and improved apparatus for sorting media in accordance with information appearing thereon in predetermined areas thereof.

The present invention has been illustrated herein in connection with the sorting of bank checks in accordance with the information of a predetermined check format. The check format comprises a plurality of areas on which control data is recorded. Certain areas have symbolical control characters recorded thereon which serve to separate other areas having digit characters recorded thereon into a plurality of fields. The fields are located on the bank check in a definite sequence and in alignment. Such limitations of disclosure have been resorted to purely for convenience of illustration and simplicity, and it is to be distinctly understood that the invention is also applicable in the sorting of other media bearing only digital, symbolical, or alphabetical characters, or a combination thereof. For instance, where only digital characters make up the fields of the check format and the fields are always specified as comprising a certain number of characters, a desired field may be identified and selected by accounting for the number of characters in the desired field. The fields may be located at various positions on the bank check, so that they may be read sequentially by a suitable character-sensing device during a single reading cycle. Where the fields are not so located, an adjustment of a suitable character-sensing device may be effected, so that only characters in the desired field are read during a single reading cycle. But, regardless of where the fields are located on the bank check, a separate character-sensing device may be provided for each field of the check format, and the sorting apparatus may be provided with means to enable a sorting machine operator to activate only the character-sensing device applicable to the field in which a sorting operation is desired to be made.

It is an object of this invention to provide sorting apparatus which will perform a sorting operation in accordance with any one of a plurality of fields of control data recorded on a data medium.

It is another object of this invention to provide sorting apparatus adapted to the sorting of media having areas on which control data is recorded, which sorting apparatus may be selectively conditioned to perform a sorting operation in accordance with control data recorded in predetermined areas of such media.

It is another object of this invention to provide sorting apparatus adapted to the sorting of media having control data recorded thereon, which sorting apparatus may be selectively conditioned to perform a sorting operation on any control data in any field of control data.

It is still another object of this invention to provide sorting apparatus applicable to the sorting of media having means for determining the length of the control data field on which the sorting operation is to be performed.

It is a still further object of this invention to provide sorting apparatus having means to eliminate unnecessary sorting passes for media not having control data recorded in a predetermined area thereof.

It is a still further object of this invention to provide sorting apparatus having means to eliminate unnecessary sorting passes for media not having significant control data recorded in a predetermined area thereof and in remaining areas of a desired sorting field.

It is a still further object of this invention to provide a sorting apparatus which is operative to produce sorting control signals indicative of the presence of particular control data at any control data position of a medium.

It is a still further object of this invention to provide a sorting apparatus having means operative to control the effect of such sorting control signals if the information read from a medium is not in a predetermined order or if a medium does not contain certain information.

It is a still further object of this invention to provide a sorting apparatus having means operative to produce special sorting control signals if the medium does not have significant control data on which to perform a sorting operation, either in a programmed or predetermined area thereof or in the remaining areas of a selected field of control data.

In accordance with a broad aspect of the present invention, apparatus for sorting media having areas on which control data is recorded comprises a control data-analyzing means which provides control data-signifying signals in response to analysis of control data recorded on the areas of the media. Means for selecting a control data-signifying signal provided by the control data-analyzing means for control data recorded on a predetermined area of each of the media provides a synchronizing signal for each of the media.

A means is utilized which is responsive to coincidental occurrence of a synchronizing signal and a certain control data-signifying signal provided for each of the media to provide a sorting control signal for each of the media, and means controlled by the sorting control signals is provided for distributing the media according to the significance of the control data recorded on the predetermined areas.

In accordance with a more specific aspect of the present invention, the sorting apparatus is adapted for the sorting of media having areas on which digit characters and control characters are recorded. The areas having control characters recorded thereon serve to separate remaining areas having digit characters recorded thereon into a plurality of sorting fields. The sorting apparatus comprises an analyzing means for providing digit character-signifying signals and control character-signifying signals in response to analysis of digit characters and control characters recorded on the areas of the media. A field selector means is provided for selecting digit character-signifying signals provided by the analyzing means for digit characters recorded in a desired sorting field of each of the media. The field selector means includes means for selecting a control character-signifying signal indicative of the start of the desired sorting field, means responsive to the selected control character-signifying signal for producing a gating signal, and a gate. The gate is coupled to the analyzing means and receives the digit character-signifying signals. The gate is controlled by the gate signal so that it passes the digit character-signifying signals provided by the analyzing means for the desired sorting field. A digit character position selector means is provided for selecting a digit character-signifying signal provided by the analyzing means for a digit character recorded on a predetermined area in the desired sorting field of each of the media to provide a synchronizing signal for each of the media. The digit character position selector means includes a counter having an input circuit to which the digit character-signifying signals of the desired sorting field are applied and a separate output circuit for successive ones of the applied digit character-signifying signals, and means to select one of the output circuits applicable to the digit character recorded in the predetermined area. A means is utilized which is responsive to coincidental occurrence of a synchronizing signal and a certain digit character-signifying signal provided for each of the media to provide a sorting control signal for each of the media, and means controlled by the sorting control signals is provided for distributing the media according to the values of the digit characters recorded on the predetermined areas.

These and other objects of this invention will be brought out more fully in the following description of an illustrative embodiment thereof, when considered in connection with the accompanying drawings, wherein like reference characters refer to like or similar parts, and in which:

FIG. 1 is an example of a media with a particular arrangement of digit and symbolic characters recorded thereon, which media can be used with the sorting apparatus according to the invention;

FIGS. 2 and 3 are diagrammatic views which together show the sorting apparatus arranged in accordance with the invention;

FIG. 4 is a timing diagram showing various control or timing signals utilized by the sorting apparatus;

Figure 3:
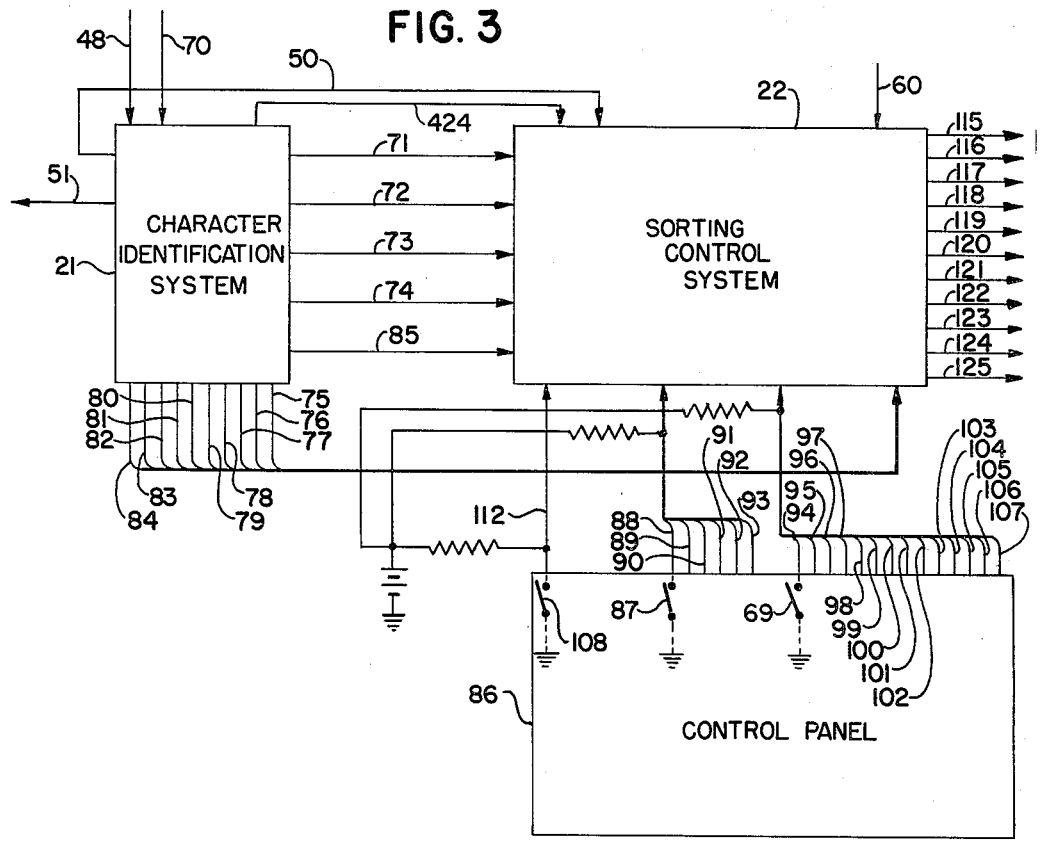

FIGS. 6(a), 6(b), 6(c), 6(d), 6(e), 6(f), and 6(g) are views in block diagram form which together show the sorting control system of the sorting apparatus arranged in accordance with the invention;

FIG. 7 is a diagram showing the manner in which FIGS. 6(a) through 6(g) should be joined together;

FIG. 8 is a showing of a preferred embodiment of a flip-flop circuit used in the counter circuits shown in FIG. 6(a), and FIGS. 6(c), 6(d), and 6(e); and FIG. 9 is a diagrammatic showing of wave forms at certain points in the sorting control system of FIGS. 6(a) through 6(g).

Check format

In an ideal sorting apparatus, a control system therefor should be capable of accepting information from a check, in any sequence, and then be able to determine the routing for that particular check. In the sorting control system to be disclosed in detail hereinafter, a compromise between flexibility and cost is reached. The information presented to the sorting control system is made uniform and in a definite sequence. This sequence of information has been considered by the American Banking Association for use in automation of banking operations. This sequence is referred to as the check format, and it is the basis for the logical design of the sorting control system of the sorting apparatus of the instant invention.

In FIG. 1 there is shown a check bearing a typical check format. The characters of the check format are printed in magnetic ink. When a check travels through the sorting machine, the ⚏ sign, or amount cue symbol, passes by the reading head of a character-sensing device first, and the remaining characters follow in sequence from right to left.

The check format comprises five major fields called the Dollar Amount (AMT.), Transaction (TRA), Account Number (AN1)—Branch Number (AN2), American Bankers Association Number (ABA), and the Federal Reserve Banks Number (FRD) fields. Each of these fields comprises a plurality of digit characters recorded on certain areas of the check, such as at 10. Other areas of the check, such as at 12, have symbolic characters recorded thereon. The symbolic characters serve to identify the fields of the check format. The Dollar Amount field is defined as comprising the digit characters appearing between the ⚏ sign or amount cue symbol and the ⁑ sign or transaction cue symbol. The transaction field is defined as comprising the digit characters appearing between the transaction cue symbol and the first of the primary cue symbols ∥. The transaction field is sub-divided into the Transaction Number 1 field (TRA1) and the Transaction Number 2 field (TRA2). The Transaction Number 1 field is defined as any digit character in the transaction field, as selected by counting characters from the right-hand side of this field. The Transaction Number 2 field is defined as the digit character appearing in the left-hand side of the Transaction field. The Account Number—Branch Number field is defined as comprising the digit characters between the first primary cue symbol and a second primary cue symbol. The Account Number—Branch Number field is sub-divided into the Account Number field and the Branch Number field. The Account Number field is defined as the digit characters appearing between the first primary cue symbol and the first of the secondary cue symbols ∥. The Branch Number field is defined as the digit characters which follow the first secondary cue symbol and precede the second primary cue symbol. The ABA field is defined as comprising the digit characters appearing between the second primary cue symbol and the second secondary cue symbol. Finally, the FRD field is defined as comprising the digit characters appearing between the second secondary cue symbol and the third primary cue symbol.

The Dollar Amount, ABA and FRD fields of the check format are defined as zero-filled fields. These fields are normally composed of a fixed number of digit characters. For example, in the illustrated format, the Dollar Amount field contains ten digit characters, and the ABA and FRD fields each contain four digit characters. Zero digit characters are always provided in these fields to the left of the highest significant digit character. In the illustrated format, the ABA field is shown comprising the digit characters 3, 6, 0, and 0, with two zero digit characters provided to the left of the highest significant digit character 6. The Transaction and the Account Number—Branch Number fields are not zero-filled fields. In the illustrated format, the Account Number field is shown comprising the digit characters 8 and 9. There are two areas or positions for digit characters provided between the highest significant digit character 9 and the first of the secondary cue symbols. There are no digit characters recorded on these areas.

The information appearing in all of the fields of the check format with the exception of the Dollar Amount field is used by the sorting control system for the sorting of checks. The Dollar Amount field is not used for the sorting of checks, but this field is checked by the sorting control system for missing digit characters. The Dollar Amount field is a zero-filled field and is specified to contain ten digit characters. If one or more of the digit characters is found missing, the particular check concerned will be rejected by the sorting control system. The ABA and FRD fields are also zero-filled fields. The sorting control system operates to check these fields for missing digit characters also, and, should there occur a wrong number of digit characters in these fields, the particular check concerned will be rejected by the sorting control system.

The Account Number, Branch Number, and Transaction fields are not zero-filled. Zero digit characters do not appear to the left of the highest significant digit character in these fields.

Time and the check format

During a check sorting operation, check travel through the sorting mechanism takes place at a rate of 150 inches per second. The check format occupies a space on the check of approximately 5.5 inches. The entire check format passes by the read head of a character-sensing device in the sorting mechanism in approximately 36 milliseconds. The length of a given field may range from 8 to 10 milliseconds, and the digit characters appearing in the check format are spaced approximately 1/8 inch apart. A character-signifying signal will be received by the sorting control system from a character identification system approximately every 850 microseconds. These character-signifying signals have a duration of from 20 to 40 microseconds.

The sorting control system develops a sorting control signal for controlling the distribution of a particular check into a particular sorting pocket before the arrival of character-signifying signals concerning the next check. Also, a given digit character is selected or counted before the arrival of a succeeding digit character.

*Time and the sorting of checks—control signals*

Although the check format or information-bearing portion of the check is approximately 5.5 inches long, the check may be up to 10 inches or 66.7 milliseconds in length. There will be an inactive or dead time of something over 40 milliseconds available for computation or manipulation, and the reading of the check by the character-sensing device is not interfered with. During this dead time, pocket gates in the sorting mechanism are opened.

In order for a given check to be present at the proper location for gating into a pocket selected by the sorting control system during the dead time of some other check, all the checks enter the sorting mechanism at discrete points in the sorting cycle. The timing of the entry point of checks into the sorting mechanism is accomplished by a feeder apparatus having a control apparatus associated therewith. The checks leaving the feeder apparatus are spaced at 80-millisecond intervals and enter the sorting mechanism in synchronism with the reading cycle of the character-sensing device. Control signals are developed in the sorting mechanism and the character identification system which are based on the time at which a check leaves the feeder apparatus. The sorting control system and the character identification system are locked into synchronism with the mechanical operation of the sorting mechanism by means of these control signals.

*Description of sorting apparatus*

A broad outline of the illustrated embodiment of the invention will first be given with reference to the block schematic diagrams of FIGS. 2 and 3, which together show the sorting apparatus arranged in accordance with the invention. The sorting apparatus illustrated in FIGS. 2 and 3 comprises a sorting or check-handling mechanism 20, a character identification system 21, and a sorting control system 22.

The sorting mechanism 20 comprises a feed magazine 23 for holding a stack of checks to be sorted. A feeder apparatus at 24 is not shown in detail but includes a suitable rotary mechanism 25, which operates to feed one check at a time and two checks for every revolution of this rotary mechanism to a check presence sensing device 30 and to a character-sensing device 31 by means of a suitable distributing or transport mechanism such as at 32.

The check presence sensing device 30 comprises a conventional photocell circuit which develops a signal 36, shown in FIG. 4(a), which is indicative of the presence of a check on the transport mechanism 32. This check presence signal is entered over line 37 to a flip-flop circuit 38. The signal 36 causes the flip-flop circuit 38 to transfer, thereby developing in its output a signal 47, which is shown in FIG. 4(c). Following the check presence sensing device 30, a check passes a permanent magnet 39, which magnetizes the characters imprinted on the check.

A timing control apparatus 40 is provided in the sorting mechanism for developing signals indicating when a check is adjacent the read head of the character-sensing device 31 and for indicating the position of this check approximately 130 milliseconds later. This control apparatus 40 may take one of many conventional forms. For instance, the control apparatus 40 may comprise a suitable rotary mechanism connected so as to rotate in synchronism with the rotary mechanism 25 of the feeder apparatus 24. The rotary mechanism of the control apparatus 40 is provided with two pairs of magnetic elements. Each pair of magnetic elements is disposed at different positions on the surface of the rotary mechanism. The control apparatus 40 also comprises a stationary field winding associated with each of the pairs of magnetic elements. A signal is developed in one of the field windings when a magnetic element associated with that winding enters the field of the winding. A signal 45, which is shown in FIG. 4(b), is developed in this winding at the time a check is adjacent the read head of the character sensing device 31. This signal 45 is entered over line 46 to the flip-flop circuit 38. The signal 45 causes the flip-flop circuit 38 to transfer again, thereby defining the duration of the signal 47. The signal 47 is entered over a line 48 to the character identification system 21.

In the character identification system 21, a square wave signal 49 is developed in a conventional manner from the signal 47. This signal is shown in FIG. 4(d). It begins at the time the check is adjacent the reading head of the character-sensing device 31, as determined by the trailing edge of the control signal 47, and terminates at the end of the character presence in the check format. The signal 49 operates to unblank the normally blanked character identification system 21, so that digit character-signifying signals and control character-signifying signals are developed by the character identification system in accordance with the digit characters and control characters of the check format. The duration of the signal 49 is approximately 36 milliseconds. The signal 49 is entered over line 50 to the sorting control system 22, where it is differentiated and clipped to provide a first timing control signal occurring at the beginning of the reading of the check format, and the beginning of the unblanking of the character identification system 21, and a second timing control signal occurring at the end of the reading of the check format, and the end of the unblanking of the character identification system 21.

The signal 49 is also entered over line 51 to a flip-flop circuit 52 located in the sorting mechanism 20. The flip-flop circuit 52 is similar to the flip-flop circuit 38. The signal 49 causes the flip-flop circuit 52 to transfer and develop in its output a signal 56, shown in FIG. 4(f).

A signal 53, shown in FIG. 4(e), is developed in the other winding of the control apparatus 40. The signal 53 is developed after the characters of a succeeding check are read by the character-sensing device 31 and before the end of unblanking of the character identification system 21 for that check. The signal 53 is entered over a line 54 to the flip-flop circuit 52 and to a conventional gate circuit 58. The signal 56 is also entered over line 57 to the gate circuit 58. The gate circuit 58 provides a third timing control signal 59, as shown in FIG. 4(g). The third timing control signal 59 occurs at the time that the positive going portion of the signal 53 is applied to it. The negative going portion 55 of the signal 53 causes the flip-flop circuit 52 to transfer, thereby defining the duration of the signal 56. The control signal 59 comprises a pulse occurring approximately 130 milliseconds after a check passes the read head of the character-sensing device 31. The third control signal is entered over line 60 to the sorting control system 22, where it is used to read out sorting control signals from the secondary memory network 344 thereof in a manner to be explained hereinafter.

The feed magazine 23 is provided to hold a stack of checks to be sorted and may take one of the many forms that are old in the art. The feeder apparatus 24 operates to feed one check at a time and two checks for every revolution of its rotary mechanism 25 from the feed magazine 23 to the check presence sensing device 30 and then to the character-sensing device 31. The check presence sensing device 30 and the control apparatus 40 are provided to initiate the development of the first, second, and third control signals as previously described. As each character of the check format is translated past the character-sensing device 31, a signal possessing a waveshape characteristic of that particular character is developed. These signals are made available over a line 70 to the character identification system or analyzing means 21, where an analysis of them is made.

The character identification system 21 identifies the characters read by the character-sensing device 31 and provides character-signifying signals indicative of the particular characters which are read. These character-signifying signals are made available to the sorting control system 22.

The character identification system 21 is connected to the sorting control system 22 by means of four lines 71, 72, 73, and 74 equal to the number of symbolic characters in the illustrated check format. There are also ten lines 75 to 84, equal to the number of digit characters that may appear in a certain area of the check format, connecting the character identification system 21 to the sorting control system 22. Another line 85 connects the character identification system 21 to the sorting control system 22. The line 85 carries an error signal should the character identification system 21 read two digit characters of the check format simultaneously. The effect of this double error signal on the sorting control system 22 will be explained hereinafter when the sorting control system 22 is described in detail.

A control panel 86 is provided at the sorting mechanism 20. This control panel is provided with six field selector switches, such as the one shown at 87, which enable an operator to select a field of the check format in which a sorting operation is to be made. The field selector switches are connected to the sorting control system 22 by means of the lines 88 to 93.

The control panel 86 is also provided with fourteen digit selector switches, such as the one shown at 69, which enable an operator to select a particular area or character position in a selected field in which a sorting operation is desired to be made. For instance, in an illustrated check format, there are five areas in the Branch field provided with the digits 6, 8, 9, 7, and 3. Fourteen digit selector switches are provided to take care of the case where the check format calls for a maximum of fourteen digits in the Branch field or any other sorting field. The digit selector switches are connected to a sorting control system 22 by means of the lines 94 to 107.

The control panel 86 is further provided with another switch, such as at 108, defined as the dollar amount error option selector switch. A control signal is entered over the line 112 to the sorting control system 22 when it is desired to sort checks in which the entire Dollar Amount field is omitted from the check format. This control signal operates to disable circuits in the sorting control system 22 which would normally cause such a check to be routed to the reject pocket in the sorting machine. A thorough understanding of the use and function of the dollar amount error option selection circuit will be apparent when the detailed description of the sorting control system is made.

At the control panel 86, an operator may select a field of the check format and an area or digit character position in the selected field in which a sorting operation is desired to be made. This program information is entered over an appropriate one of the field selector lines 88 to 93 and an appropriate one of the digit character position selector lines 94 to 107 to the sorting control system 22. The sorting control system 22 also receives from the character identification system 21 symbol or control character-signifying signals identifying the fields of the check format over the lines 71 to 74 and digit character-signifying signals over the lines 75 to 84. The sorting control system 22 functions to develop a sorting control signal for each check. These sorting control signals are entered over the lines 115 to 125 (FIG. 2) to control suitable solenoid-operated pocket gates, such as the ones shown at 126, 127, and 128 (FIG. 2) at the sorting mechanism 20. The pocket gates allow the distribution of checks at various stations which are in the form of pockets such as shown at 129, 130, and 131. The first pocket at 129 is provided to receive checks for which a special sorting control or decision signal has been developed in the sorting control system 22. Following this pocket there are ten pockets provided for the digits zero to nine which may appear on an area of the check format. Following these digit pockets there is a twelfth or reject pocket, such as shown at 132, which is provided to receive checks for which no sorting control signals have been developed by the sorting control system 22 during a sorting operation. The reject pocket will also receive checks which bear a format differing from the specified one.

Figure 5:
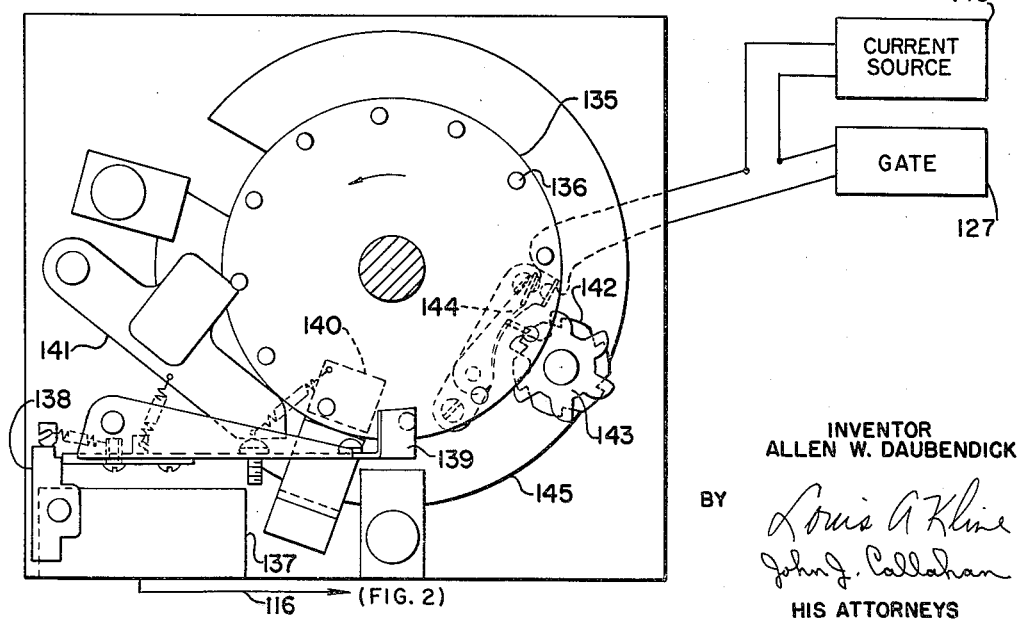
FIG. 5 is a top plan view of a mechanical memory unit which is used with the sorting apparatus.

A storage device or mechanical memory unit, such as shown at 133 and 134, is provided ahead of each of the ten pocket gates which control the distribution of checks to the pockets corresponding to the digit characters zero to nine. The storage device is shown in detail in FIG. 5. It comprises a pin wheel 135 carrying twelve pins 136, a solenoid shown at 137, a latch 138, a pin setting cam 139, a pin resetting cam 140, a latching cam 141, a switch cam 142 and associated starwheel 143, a switch 144, and a mounting board 145 for the switch cam 142 and the starwheel 143. The pin wheel 135 is adapted to rotate at a constant speed in synchronism with the travel of the transport mechanism 32. Checks are fed to the transport mechanism 32 at the rate of one every 80 milliseconds. The transport mechanism 32 is designed to transport a check at the rate of 150 inches per second. The pin wheel 135 is rotated at a speed such that each of its pins 136 may become effective to operate the switch 144 eighty milliseconds after an immediately preceding pin 136 was in a position to effect operation of the switch 144. The pins 136 of the pin wheel 135 may be set in one of two positions; that is, projecting either upward or downward from the pin wheel 135.

The following is the sequence of events which occurs when the storage device is energized by a sorting control signal received from the sorting control system 22. The sorting control signal is applied to the solenoid at 137, which in turn moves the latch 138. This movement of the latch 138 causes the pin setting cam 139 to engage one of the pins 136. The pins 136 are normally in a position projecting upward from the pin wheel 135. The engaged pin is depressed so that it projects downward from the pin wheel 135 to the level of the starwheel 143. The pin wheel 135 rotates, carrying the depressed pin to the switch cam 142 and the starwheel 143. The depressed pin rotates the switch cam 142 and the starwheel 143, causing the switch 144 to close until the pin passes. When the switch 144 is closed, the solenoid of a pocket gate, such as the gates 127 and 128 (FIG. 2), will be energized. The period of time that the switch 144 is closed may be adjusted for the control of the duration of the energization of the solenoids of the pocket gates. A subsequent pin engages the latching cam 141, which in turn restores the pin setting cam to its initial position away from the pins 136. The pin resetting cam 140 restores the depressed pin to its initial position.

Referring back to FIG. 2, it is seen that, if a check is to be distributed to the special decision pocket at 129, the solenoid-operated pocket gate at 126 will be controlled directly by a sorting control signal appearing on the line 115, and, if a check is to be distributed to any pocket other than the special decision pocket at 129, or the reject pocket at 132, the storage devices, such as those shown at 133 and 134, will delay the effect of the sorting control signals, so that the proper solenoid-operated pocket gate, such as those shown at 127 and 128, will be operated at the proper time. For example, when the switch 144 (FIG. 5) is closed in response to a sorting control signal being applied over the line 116 to the solenoid at 137, energizing current for the solenoid-operated gate at 127 is applied thereto from a suitable source of energizing current, such as that shown at 146. Thus, the sorting control signals control the sorting mechanism 20 to cause the distributing mechanism at 32 to distribute the checks to the correct sorting pockets at the proper time.

The angular speed of the pin wheel 135 is such that the interval between the pins 136 is equal to the check cycle of 80 milliseconds. This allows the above sequence of events to occur for each check. The sorting control signal at the output of the sorting control system 22 is timed by the third timing control signal to occur 130 milliseconds after the applicable check passes the read head of the character-sensing device 31. Thus, the check is at a fixed point on the transport mechanism 32 at this time. From this fixed point the check must travel a different distance to each of the ten pockets controlled by a storage device. The storage device for each of these pockets operates to delay the effect of a sorting control signal, so that the opening of a particular pocket gate will not occur until the applicable check arrives at that pocket gate. The amount that the sorting control signals are delayed in their effect on the energization of the solenoids of the pocket gates by the storage devices is set by the time of travel of a depressed pin 136 of the pin wheel 135 to the switch 144. For the zero pocket gate at 127, the delay provided by the storage device at 133 will be short, and so the switch cam 142 and the switch 144 will be close to the pin setting cam 139. For the number nine pocket gate at 128, the delay provided by the storage device at 134 will be longer, and so the switch cam 142 and the switch 144 will be farther from the pin setting cam 139. The mounting board 145 can be rotated to adjust the time of delay of a storage device.

A character identification system or analyzing means of a type suitable for use herein may be found described and shown in British Patent No. 785,853, to K. R. Eldredge, published November 6, 1957. Another suitable type is described and shown in British Patent No. 786,466, to K. R. Eldredge et al., published November 20, 1957.

It is shown in the above patents that the output of a character-sensing device provides a wave-shape characteristic of each character read by it. A sampling of the wave-shape at various points thereof is effected to provide a signal presenting a unique voltage pattern which is a binary representation for the character. This binary representation signal may then be entered into a suitable code converter. The converter may comprise a number of output channels equal to the number of different characters which may be read by the character-sensing device.

The presence of a signal in a certain designated output channel of the converter will signify the reading of a character corresponding to the designation of that channel.

Another type of character identification system suitable for use herein may be found described and shown in an article by Eldredge et al. in Proceedings of the Eastern Joint Computer Conference, December 10–12, 1956, T–92, entitled "Automatic Input for Business Data-Processing System." In this article, it is shown that the output of a character-sensing device is entered into a delay line having a plurality of taps along its length. The circuitry from the delay line onward is divided into a number of channels equal to the number of different characters to be decoded. At the head of each channel there is a correlating network from which auto-correlation and cross-correlation voltages are derived for each character as it is passed through the delay line.

Each correlation network is designed on the basis of expected wave-shape for its corresponding character. If the wave-shape from such a character is passed through the delay line, the particular correlation network will develop a higher output than any of the others at the time that particular wave-shape is properly stationed within the delay line.

The system is designed so that in the normal case only one channel is positive and the remaining channels are negative. The presence of a positive signal in a certain designated channel will signify the reading of a character corresponding to the designation of that channel.

*Sorting control system—general description*

The sorting control system 22, shown in block form only in FIG. 3, is shown in detail in FIGS. 6(a) through 6(g). Referring now to these figures, the sorting control system 22 has symbol or control character signal input terminals 150 to 153. Primary cue symbol-signifying signals, secondary cue symbol-signifying signals, amount symbol-signifying signals, and transaction symbol-signifying signals are made available to the input terminals 150 to 153, respectively, over the lines 72, 71, 73, 74, from the character identification system 21. The sorting control system 22 also has input terminals 154 to 156. Doubles error signals and the control signals shown in FIG. 4(d) are made available over the lines 424 and 50 (FIG. 3), respectively, to the input terminals 154 and 155, respectively, from the character identification system 21. At the terminal 156, the timing control signals shown in FIG. 4(g) are made available over the line 60 (FIGS. 2 and 6(g)) from the sorting machine 20.

The sorting control system 22 also has six program field selector input terminals 157 to 162 (FIG. 6(a)) at which field selector signals are made available over the lines 88 to 93 (FIG. 3) manually and remotely by the actuation of the field selector switches 87 located at the control panel 86. The selection of the various fields of a check format is effected by a change in level of signals present at the input terminals 157 to 162 and such a change is brought about by actuation of the field selector switches by an operator of the sorting apparatus. The field selector switches 87 are connected to the input terminals 157 to 162 over the lines 88 to 93 (FIG. 3). Field selector signals are then made available to three sets 163, 164, and 165 of gates. The set 163 is used for selecting a field of the check format in which a sorting operation is desired to be made, while sets 164 and 165 are used to support accessory functions performed by the sorting control system 22. These accessory functions will be explained in detail hereinafter.

The set 163 of field selector gates comprises the six "and" gates 166 to 171, while the sets 164 and 165 of accessory gates comprise six "and" gates 172 to 177, and five "and" gates 178 to 182, respectively. The output sides of the gates 166 to 171 are connected to an "or" circuit 183. The output sides of the gates 172 to 177 are connected to another "or" circuit 184. And, the output side of the gates 178 to 182 are connected to a further "or" circuit 185.

The program information for selection of the FRD field of a check format will appear at the input terminal 157 and is entered over a line 190 to the "and" gates 166, 172, and 178. The program information for selection of the ABA field will appear at the input terminal 158 and is entered over a line 191 to the "and" gates 167, 173, and 179. The program information for selection of the Branch Number field will appear at the input terminal 159 and is entered over a line 192 to the "and" gates 168, 174, and 180. The program information for selection of the Account Number field will appear at the input terminal 160 and is entered over a line 193 to the "and" gates 169, 175, and 181. The program information for selection of the Transaction No. 1 field will appear at the input terminal 161 and is entered over a line 194 to the "and" gates 170, 176, and 182. Finally, the program information for selection of the Transaction No. 2 field will appear at the input terminal 162 and is entered over a line 195 to the "and" gates 171 and 177. The sorting control system 22 also has fourteen program digit position selector input terminals 200 to 213 (FIG. 6(c)), at which digit position selector signals are made available over the lines 94 to 107 (FIG. 3) manually and remotely by the actuation of the digit position selector switches 69 located at the control panel 86. The selection of the various digit positions of a check format on which a sorting operation is to be made is effected by a change in level of signals present at the input terminals 200 to 213, and such a change is effected by actuation of the digit position selector switches by an operator of the sorting apparatus. The digit position selector switches are connected to the input terminals 200 to 213 over the lines 94 to 107 (FIG. 3). The digit position selector signals are then made available to a field digit count selector network 214 (FIGS. 6(c), 6(d), and 6(e)). The network 214 comprises fourteen "and" gates 215 to 228. Digit position selector signals appearing at the input terminals 200 to 213, respectively, are entered over the lines 229 to 242 to the "and" gates 215 to 228. The lines 229 to 242 each include a diode, such as at 243, connected so as to allow passage of digit position selector signals to the network 214 and to prevent Transaction No. 2 program signals from passing from the program field input terminal 162 through an "or" circuit 244 to any of the program digit position input terminals 200 to 213. The "or" circuit 244 permits every digit position selector line to be simultaneously grounded through the Transaction No. 2 field selector switch 87 at the control panel 86 when the Transaction No. 2 field is the one selected in which to perform a sorting operation. This grounding of the digit position selector lines 229 to 242 effects a change in level of signals present on each of these lines in the same manner as if accomplished by the digit position selector switches at the control panel 86. Therefore, when a Transaction No. 2 field is desired to be sorted on, a sorting control signal is developed by the sorting control system 22 for each digit character present in this field.

Figure 6G:
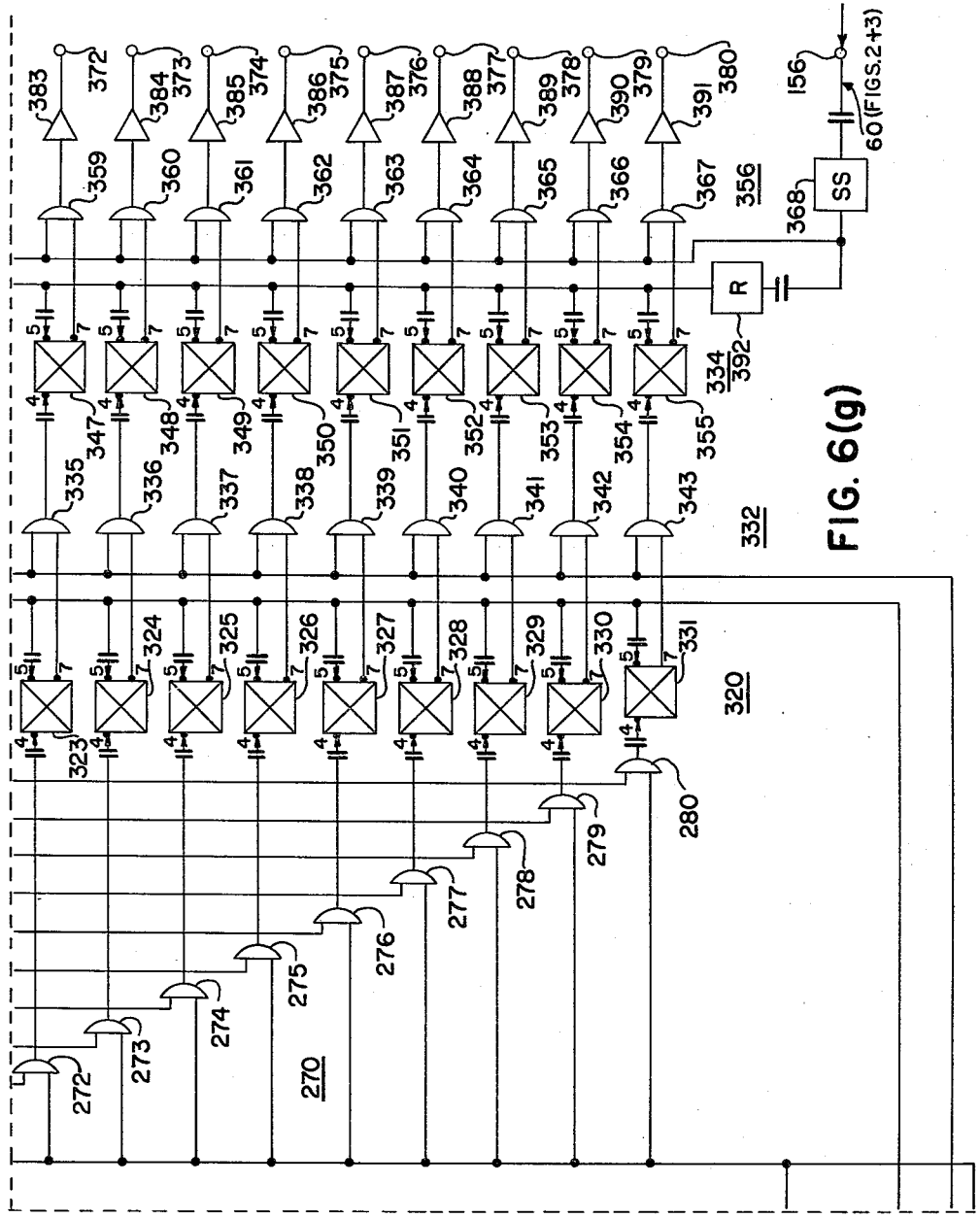

The sorting control system 22 also has ten input terminals 250 to 259 (FIG. 6(f)), at which digit character-signifying signals representing the digits zero to nine, respectively, are made available over lines 75 to 84 (FIG. 3) from the character identification system 22. A separate one of the lines 75 to 84 is provided for digit character-signifying signals representing each of the digits zero to nine which may be developed by the character identification system 22. Digit character-signifying signals appearing at the terminals 250 to 259 are entered over the lines 260 to 269 to a sorting control selector network 270 (FIGS. 6(f) and 6(g)). The selector network 270 comprises ten "and" gates 271 to 280.

Referring again to FIG. 1, briefly, it is seen that three primary cue symbols and two secondary cue symbols are used in the illustrated check format to identify the Account Number, the Branch Number, the ABA, and the FRD fields. The sorting control system 22 is provided with a sequence counter 281 (FIG. 6(a)) comprising four flip-flop circuits 282 to 285. The counter 281 is used to count the primary cue symbol-signifying signals appearing at the terminal 150 and is thus defined as a primary cue symbol counter. Each of the flip-flop circuits 282 to 285 has a terminal pin designated as "4" which is connected to the primary cue symbol input terminal 150 through a capacitor. The flip-flop circuit 282 has a terminal pin designated as "7" which is connected through suitable neon devices 286 to 289 to the terminal pins designated as "6" of the flip-flop circuits 283 to 285. The terminal pins designated as "6" of the flip-flop circuits 282, 283 and 284 are also connected to the terminal pins designated as "5" of the succeeding flip-flop circuits. The terminal pin designated as "7" of the flip-flop circuit 283 is connected to the "and" gate 169 and to a diode gate 290. The terminal pin designated as "7" of the flip-flop circuit 284 is connected to the "and" gate 167 and to another diode gate 291. The secondary cue symbol signal input terminal 151 is also connected to the diode gates 290 and 291.

The primary cue symbol counter 281 and the diode gates 290 and 291 provide identification of the Account Number field, the Branch Number field, the ABA field, and the FRD field. The transaction cue signal terminal 153 is connected to the "and" gates 170 and 171 to provide identification of the Transaction No. 1 and Transaction No. 2 fields.

The set 163 of "and" gates 166 to 171 is provided to allow selection of the various fields of the check format and occurs as follows: When an FRD field program signal appears at the input terminal 157, the output of the gate 291 is communicated to the input of a field gate generator or field presence memory device which comprises a flip-flop circuit 295; when an ABA field program signal appears at the input terminal 158, the output of the flip-flop circuit 284 is communicated to the input of the flip-flop circuit 295; when a Branch No. field program signal appears at the input terminal 159, the output of the gate 290 is communicated to the input of the flip-flop circuit 295; when an Account Number field signal appears at the input terminal 160, the output of the flip-flop circuit 283 is communicated to the input of the flip-flop circuit 295; and when a Transaction No. 1 field program signal appears at the input terminal 161, the signal appearing at the transaction symbol signal input terminal 153 is communicated to the input of the flip-flop circuit 295. The set 163 of "and" circuits 166 to 171 drive the flip-flop circuit 295 through the "or" circuit 183. When the flip-flop circuit 295 is triggered, a gating pulse is initiated at the control inputs of a field digit count gate 296 (FIG. 6(a)) and an accessory function gate 297 (FIG. 6(a)). The gate 296 receives digit character-signifying signals from an "or" circuit 298 (FIG. 6(c)) connected across the digit character-signifying lines 260 to 269 (FIG. 6(f)) and functions to control the digit character-signifying signal input to a sequence counter 299 (FIGS. 6(c), 6(d), and 6(e)). Thus, the field selector means comprising, for example, the field selector switches, such as the one shown at 87 in FIG. 3, the counter 281, the gates 290 and 291, the set 163 of field selector gates, the "or" circuit 183, the flip-flop circuit 295, and the gate 296 is provided for selecting control data-signifying signals or digit character-signifying signals provided by the analyzing means and which are applicable to control data or digit characters recorded in a desired sorting field of a medium.

The counter 299 comprises fifteen flip-flop circuits 300 to 314. The counter 299 is used to count the digit character-signifying signals developed from the reading of the digit characters appearing in a selected field of the check format and is defined as a field digit counter. The gate 297 is used to support accessory functions which will be explained hereinafter. The reset operation of the flip-flop circuit 295, which establishes its initial condition, is involved with accessory functions of the sorting control system 22 and will also be explained hereinafter.

The programming of the fourteen outputs of the counter 299 is accomplished manually and remotely by an operator by the actuation of the digit selector switches 69 at the control panel 86. Each digit selector switch 69, when actuated, operates an associated one of the "and" gates 215 to 228 of the field digit count selector network 214 when the "and" gates 215 to 228 also receive a negative going output from the counter 299. The outputs of the "and" gates 215 to 228 are entered through an "or" circuit 315 (FIG. 6(d)) to a squaring circuit 316. One output of the squaring circuit 316, as shown in FIG. 9(a), is supplied to an amplifier 317; and another output, as shown in FIG. 9(b), is supplied to an amplifier 318. The signal shown in FIG. 9(a) is a square wave signal whose primary function is to provide a steep trailing edge for processing in the amplifier 317. The signal shown in FIG. 9(b) is also a square wave signal whose function is to provide a suitable leading edge for processing in the amplifier 318. The output of the amplifier 317, as shown in FIG. 9(c), provides a sorting synchronizing or gating signal for the sorting control selector network 270. Thus, the control data or digit character area selector means comprising, for example, the selector switches, such as the one shown at 69 in FIG. 3, the counter 299, the count selector network 214, the "or" circuit 315, the squaring circuit 316, and the amplifier 317 is provided for selecting a control data-signifying signal or digit character-signifying signal provided for control data or a digit character recorded on a similarly located area of each of the media to provide a sorting synchronizing signal for each media.

The sorting synchronizing signal appears as an input to the "and" gates 271 to 280 in time coincidence with a certain digit character-signifying signal on one of the lines 260 to 269 and allows the passage of that digit character-signifying signal to a primary memory network 320 (FIGS. 6(f) and 6(g)). Normally, when a sorting synchronizing signal arrives at the sorting control selector network 270, it will appear simultaneously with a digit character-signifying signal present on only one of the lines 260 to 269. Accordingly, only one of the "and" gates 271 to 280 is actuated, and the output signal from the gate so actuated will trigger a corresponding flip-flop circuit of the primary memory network 320.

The primary memory network 320 comprises eleven flip-flop circuits 321 to 331. Ten of the flip-flop circuits, numbered 322 to 331, are provided for storage of the outputs of the "and" gates 271 to 280, while the flip-flop circuit 321 is provided for special control functions. The initial conditions of the flip-flop circuits 321 to 331 are established by a reset operation which is described hereinafter.

A first read-out network 332, comprising the "and" gates 333 to 343, is provided for the primary memory network 320. When a read-out signal arrives at the inputs of the "and" gates 333 to 343, the signals stored in the primary memory network 320 are transferred into a secondary or a final memory network 344. The secondary memory network 344 comprises eleven flip-flop circuits 345 to 355. The purpose of the secondary memory network 344 is to retain the sorting control signals until the arrival of the third timing control signal from the sorting mechanism 20. The operation of the secondary memory network 344 is identical to that of the primary memory network 320 and differs in function only, in that it supplies sorting control signals to the sorting mechanism 20 instead of to an internal memory network.

A second readout network 356, comprising the "and" gates 357 to 367, is provided for the secondary memory network 344. The third timing control signal which appears at the input terminal 156 (FIG. 6(g)) is stretched in a stretcher 368 comprising a one-shot multi-vibrator to a length of approximately 15 milliseconds. The third timing control signal is used to read out the sorting control signals stored in the secondary memory network 344. The sorting control signals will then appear at the sorting control system output terminals 370 to 380, from where they are entered over the lines 115 to 125, (FIG. 2) respectively, to the storage devices, such as those shown at 133 and 134 in the sorting mechanism 20. A suitable amplifier 381 to 391 is provided between each of the "and" gates 357 to 367 of the second read-out network 356 and the output terminals 370 to 380. The amplifiers 381 to 391 operate to modify the high voltage, low current sorting control signals from the read-out network 356, so that high current, low voltage sorting control signals are available at the output terminals of the sorting control system. This type of sorting control signals will operate suitable power amplifiers which may be provided for actuating the solenoids of the storage devices provided for the pocket gates of the sorting mechanism 20.

The sorting control signals have a duration of 15 milliseconds, which is equal to the length of the third timing control signal. At the end of this period, a reset signal is developed in a suitable reset generator circuit 392 (FIG. 6(g)), which returns the flip-flop circuits 345 to 355 of the secondary memory network 344 to their reset state.

The first timing control signal is formed by a reset generator circuit 395 (FIG. 6(b)), to which the positive square wave control signal 49 is applied from the input terminal 155. The first timing control signal is a negative going signal having a sharp rise time and a long decay time. The first timing control signal is applied to the digit counter 299 and to the field selection counter 281 to reset these counters. The first timing control signal is also applied through an "or" circuit 396 (FIG. 6(d)) to the primary memory network 320. Thus the primary memory network 320 is reset when the leading edge of a check passes the character-sensing device 31 at the time of unblanking of the character identification system 21. The amplifier 318 (FIG. 6(d)) provides a negative going reset signal, as shown in FIG. 9(d), which is also applied through the "or" circuit 396 to the primary memory network 320. Thus the primary memory network 320 is completely cleared of stored information at the time of a sorting synchronizing signal and at the time of presence of a digit character-signifying signal, so that retention of only the desired sorting control signal in the primary memory 320 is insured.

The Transaction No. 2 field comprises the last digit character recorded in an area of the check format following the Transaction cue symbol. Thus, the number of digit characters following the Transaction cue symbol may vary. Also there may be only one digit character in this field, as shown in the illustrated check format. In order to locate this field and read the information therein, use is made of the clearing or reset action of amplifier 318. A sorting control signal is produced for the first digit character encountered following the Transaction cue symbol, and it is stored in the primary memory network 320. As subsequent digit characters are read, the output of the amplifier 318 will be applied through the "or" circuit 396 to the primary memory network 320 to reset it and cancel the previously developed sorting control signals.

The Transaction No. 2 field is identified by the Transaction cue symbol-signifying signal appearing at the input terminal 153. This field is terminated when the first primary cue symbol-signifying signal passes through the gate 297 and the "or" circuit 184 to reset the flip-flop circuit 295 and thus inhibit the further passage of digit character-signifying signals through the gate 296 to the counter 299. The last sorting control signal present in the primary memory network 320 before the occurrence of the first primary cue symbol-signifying signal is subsequently utilized to control a sorting operation in the Transaction No. 2 field.

The second timing control signal is formed by the squaring circuit 397 (FIG. 6(b)), to which the control signal 49 is applied from the input terminal 155. The second timing control signal is a negative going square wave signal. This signal is differentiated and appears at the output of amplifier 398 as a negative going signal with a sharp rise time and a long decay time. The second timing control signal is aplied through an "and" gate 399 to the first read-out network 332 to effect the transfer of information stored in the primary memory 320 to storage in the secondary memory 344.

If there is an error occurring in the format of a check that is being read, or if an error occurs in the reading of the information of a check format, the second timing control signal will be inhibited, and a sorting control signal aplicable to that check will not be stored in the secondary memory network 344. Since a sorting control signal is not stored in the secondary memory network 344 in this case, the check in question will travel the full length of the sorting mechanism 20 and pass into the reject pocket 132. The manner in which errors of the above type are detected will be explained hereinafter.

*Primary cue symbol counter*

The counter 281 comprises the four flip-flop circuits 282 to 285. A preferred embodiment of a flip-flop circuit is illustrated in FIG. 8. Each of the flip-flop circuits includes two tubes with its grids and anodes connected in an inverse-parallel manner. Each flip-flop circuit has two stable conditions, one with one tube conducting and the other tube cut off, and the second condition with the conduction-nonconduction states of the tubes reversed. The flip-flop circuit of FIG. 8 functions in the following manner. When the voltage at the "6" terminal pin is at substantially plus 190 volts with respect to ground potential, the voltage at the terminal pin "7" will be at about plus 95 volts and vice versa. When a signal of negative going polarity appears at the terminal pin "5," the voltage at the terminal pin "7" will decrease to plus 95 volts, and when a signal of negative going polarity appears on the terminal pin "4," the voltage at the "7" terminal pin will increase to about plus 190 volts.

The counter 281 is reset by the first timing control signal or reset signal developed in the output of the reset generator 395 as heretofore described. This signal will be a negative going voltage having sufficient amplitude to produce ionization in the associated neon devices 286 to 289 and thereby allow resetting of all of the flip-flop circuits 282 to 285. The action of the first timing control signal on the counter 281 is such that a count of zero is stored. The first timing control signal appears at the terminal pin "7" of the flip-flop circuit 282 and forces it in a negative direction to plus 95 volts. The first timing control signal enters the flip-flop circuit 283 at the terminal pin "6" and forces it in a negative direction, which in turn drives terminal pin "7" to plus 190 volts. There are two terminal pins energized by the first timing control signal as it enters the flip-flop circuit 284. The desired reset signal enters the flip-flop circuit 284 at the terminal pin "6" and resets the same in the same manner as the flip-flop circuit 283. The signal appearing at terminal pin "5" is at a lower level than the desired reset signal and therefore has a cancelling effect on the operation of the flip-flop circuit 284. A capacitor is included in the coupling network into the terminal pin "5," so that the reset action will not be inhibited. The time constant of this capacitor is very short in relation to the duration of the first timing control signal. As a result, the signal appearing at the terminal pin "5" will have diminished to a very low level while the signal at the terminal pin "6" will remain high and thus the desired reset action occurs. The flip-flop circuit 285 operates in the same manner as the flip-flop circuit 284. In this way, the counter 281 is reset and is now ready to accept a first primary cue symbol-signifying signal.

With the counter 281 reset, only the flip-flop circuit 282 will be sensitive to negative signals. Therefore, the first primary cue symbol-signifying signal will cause the voltage appearing at the terminal "6" of this flip-flop circuit to go from plus 190 volts to plus 95 volts. This signal wil be differentiated and appear at the terminal pin "5" of the flip-flop circuit 283 as a negative spike which causes the voltage at the terminal pin "6" of this flip-flop circuit to go from plus 95 volts to plus 190 volts. As the terminal pin "5" of the flip-flop circuit 284 is not sensitive to a positive going signal due to its former reset action, no change will occur in the flip-flop circuit 284 at this time. The voltage at the terminal pin "7" of the flip-flop circuit 283 will go from plus 190 volts to plus 95 volts, providing a signal which is applied to the set 163 of field selector gates 166 to 171. A similar action occurs when subsequent primary cue symbol-signifying signals are applied to the counter 281, and, as a result, this counter will step one position with each incoming primary cue symbol signal.

*Digit counter*

The counter 299 comprises the fifteen flip-flop circuits 300 to 314. These flip-flop circuits may be of the type shown in FIG. 8. The counter 299 operates in the same manner as the counter 281. Thus, for any digit character of the check format in a selected field thereof, a negative going signal will appear at one of the inputs to a corresponding "and" gate of the field digit count selector 214. For example, the counter 299, in response to the first digit character-signifying signal applicablt to the first digit character in the selected field of the check format, will develop a negative going output signal which will appear at one input of the "and" gate 215. If the digit selector switch 69 on the control panel 86 is closed at this time, a negative going signal will appear at the other input of the "and" gate 215, so that this gate will pass a negative going signal to the "or" circuit 315. Similarly, the counter 299, in response to the second digit character-signifying signal applicable to the second digit character in the selected field of the check format, will develop a negative going output signal which will appear at one input of the "and" gate 216. If the digit selector switch on the control panel 86 which is associated with the "and" gate 216 is closed at this time, the "and" gate 216 will pass a negative going signal to the "or" circuit 315. The output of the counter 299, developed in response to the third digit character-signifying signal applicable to the third digit character in the selected field of the check format, will appear at one input of the "and" gate 217, and so on.

*Error detection accessories*

The error detection accessories operate to guard the sorting apparatus from performing erroneous operations. The error detection accessories are conveniently described by referring first to the sorting control cancellation circuitry, which is actuated by all the error detection accessories.

The sorting control cancellation circuitry comprises a flip-flop circuit 400 (FIG. 6(d)), which is triggered through an "or," circuit 401 (FIG. 6(b)), which receives error signals from a plurality of error signal sources. The flip-flop circuit 400 in turn closes the normally open "and" gate 399, inhibiting the communication of the second timing control signal to the first set 332 of readout gates. Thus, error signals from the "or" circuit 401 will inhibit the readout of sorting control signals from the primary memory network 320. The flip-flop circuit 400 is reset by the first timing control signal developed by the reset generator 395 and will remain in its reset state until an error signal is developed.

The "or" circuit 401 receives error signals from six error signal sources in the illustrated embodiment of the invention. The error signal sources are concerned with erroneous primary cue symbol count detection, missing amount cue symbol detection, missing amount digit detection, doubles reading error detection, FRD field digit count detection, and ABA field digit count detection.

*Primary cue symbol count detection*

The purpose of primary cue symbol count detection is to avoid erroneous counts of primary cue symbol-signifying signals which might result in developing a sorting control signal in a wrong field of digit characters of the check format. According to the illustrated check format, the primary cue symbol is used three times per check. The counter 281 will count the primary cue symbol-signifying signals, and, should one of these signals be missing, a lower count will be retained in the counter 281. This lower count or a count greater than the number of primary cue symbols in the check format will be manifested by a signal of lower than normal level at the terminal pin designated as "6," of the flip-flop circuit 285. In response to this signal of lower than normal level, a normally closed diode gate 405 (FIG. 6(b)) will open to allow the second timing control signal to pass through the "or" circuit 401 and result in actuation of the sorting control cancellation flip-flop circuit 400 (FIG. 6(d)). The check in question will be routed in this case to the reject pocket 132 in the sorting mechanism 20.

*Missing amount cue symbol detection*

Missing amount cue symbol detection begins with a flip-flop circuit 410 (FIG. 6(b)). The flip-flop circuit 410 is reset to a ready state by the first timing control signal, and it is triggered from this normal reset condition to an active state by the presence of an amount cue symbol-signifying signal at the input terminal 152. If the amount cue symbol-signifying signal appears at the input terminal 152, this condition will be manifested by a signal of greater than normal level at the terminal designated as "7" of the flip-flop circuit 410, and the diode gate 411 will be closed. But, if the amount cue symbol-signifying signal should fail to appear at the input terminal 152, this condition will be manifested by a signal of greater than normal level at the terminal designated as "7" of the flip-flop circuit 410, and the diode gate 411 will operate to allow the first primary cue symbol-signifying signal, which appears at the input terminal 150, to pass to the "or" circuit 401 and result in actuation of the sorting control cancellation flip-flop circuit 400. The check in question will be routed in this case to the reject pocket 132 in the sorting mechanism 20.

*Missing amount digit character detection*

The purpose of missing amount digit character detection is to account for the number of digit characters in the amount field. This detection applies to the amount field, as this field is specified by the check format to be zero-filled.

Missing amount digit character detection begins with a flip-flop circuit 415 (FIG. 6(b)) which is triggered from its reset condition by an amount cue symbol-signifying signal from the input terminal 152. When the flip-flop circuit 415 is triggered to its active state, an "and" gate 416 is opened, allowing digit character-signifying signals from the "or" circuit 298 (FIG. 6(c)) to be applied through an "or" circuit 417 to a one-shot multivibrator 418 and also to a normally closed gate 419. The amount cue symbol-signifying signal from the input terminal 152 is also used to trigger the one-shot multivibrator 418 through the "or" circuit 417. The one-shot multivibrator 418 is provided with an internal discharge time constant which will not permit it to return to its monostable condition for a period slightly greater than the interval of a digit character-signifying signal. The one-shot multivibrator 418 is triggered by an amount cue symbol-signifying signal to take care of the situation where least significant digit characters are absent from the check format.

If a digit character is missing from the Amount field, an excessive time interval between the amount cue symbol-signifying signal and the digit character-signifying signals will ensue, and the one-shot multivibrator 418 will discharge. The trailing edge of this discharge function is removed by differentiation and used to trigger a flip-flop circuit 420 to its active state. The flip-flop circuits 415 and 420 are both reset through an "or" circuit 421, which passes the transaction cue symbol-signifying signals appearing at the input terminal 153 and the primary cue symbol-signifying signal appearing at the input terminal 150. With the flip-flop circuit 420 in its active state, there will be a signal of lower than normal level at the terminal designated as "7." This condition will cause the normally closed gate 419 to open and allow the next digit character-signifying signal to pass to the "or" circuit 401 and result in the actuation of the sorting control cancellation flip-flop circuit 400. The check in question will be routed in this case to the reject pocket 132 in the sorting mechanism 20.

If the gate 419 is opened and a reset signal appears at the flip-flop circuits 415 and 420 before the next digit character-signifying signal following the excessive time interval, then the gate 419 will be closed, and error detections in this missing amount digit character detection circuit are further inhibited.

The primary cue symbol-signifying signals are included in the resetting of the flip-flop circuits 415 and 420 to provide for the case where checks have a modified check format, in which the transaction cue symbol does not appear. However, on such checks the transaction fields shall have been completely omitted, and the first primary cue symbol-signifying signal will precede any additional digit character-signifying signals. It is to be noted that, if a transaction cue symbol is present on a check and a transaction cue symbol-signifying signal is not developed, a missing amount digit character error signal will be developed.

*Doubles detection*

Doubles detection signals originate in a character identification system 21 and are delivered over the line 424 (FIGS. 3 and 6(b)) to the input terminal 154 of the sorting control system 22. The doubles detection signals are developed in the character identification system 21, when two digits are read simultaneously by the character-sensing device 31. A doubles signal delivered over the line 424 to the input terminal 154 is amplified by an amplifier 425 and applied to a normally closed "and" gate 426. The "and" gate 426 also has a sorting synchronizing signal from the amplifier 317 applied to it. The sorting synchronizing signal will open the "and" gate 426 to allow the doubles signal to pass to the "or" circuit 401 if the doubles signal coincides in time with the sorting synchronizing signal. Thus, doubles signals are admitted to the "or" circuit 401 only when they apply to the interval of a digit character on which a sorting operation is to be made. The admission of a doubles signal to the "or" circuit 401 results in actuation of the sorting control cancellation flip-flop circuit 400, thereby causing the check in question to be routed to the reject pocket 132 in the sorting mechanism 20.

*FRD field digit character count detection*

The purpose of FRD field digit character count detection is to confirm the accuracy of the counting of digit characters in the FRD field and, as well, the accuracy of the check format by accounting for the total number of digit characters in the programmed FRD field. This detection applies to the FRD field, since it is specified by the check format to be zero-filled.

FRD field digit character count errors are detected when a sorting program is set up in the FRD field. Under these circumstances, the FRD field selector switch 87 is closed at the control panel 86 of the sorting mechanism 20, thus opening the "and" gates 166, 172, and 178 in the sorting control system 22. The "and" gate 172 will communicate the output signal of the field digit character counter 299 appearing at the terminal designated as "7" of the flip-flop circuit 304 (FIG. 6(d)) to the reset side of the flip-flop circuit 295, since the check format specifies four digits in the FRD field, zero-filled if necessary. Ordinarily, then, the field digit counter 299 will count four digit character-signifying signals and then automatically close the gates 296 and 297 by resetting flip-flop circuit 295 through the "and" gate 172 and the "or" circuit 184. But, if there should be a digit character-signifying signal missing in this field, the field digit counter 299 will not reach a fourth count before the next or third primary cue symbol-signifying signal arrives at the gate 297 through an "or" circuit 430 (FIG. 6(a)). This primary cue symbol-signifying signal will pass through the "and" gate 178 to the "or" circuit 401, resulting in an actuation of the sorting control cancellation flip-flop circuit 400, thereby causing the check in question to be routed to the reject pocket 132 in the sorting mechanism 20. The flip-flop circuit 295 is reset by the output of the gate 297 in this latter case.

This flip-flop circuit 295 is reset by the outputs of the six programmed "and" gates 172 to 177 if the accessory functions of the sorting control system 22 associated with these gates are not applicable and is reset by the output of the gate 297 when these accessory functions are applicable.

ABA field digit character count detection

The purpose of ABA field digit character count detection is to confirm the accuracy of the counting of digit characters in the ABA field and, as well, the accuracy of the check format by accounting for the total number of digit characters in the programmed ABA field. This detection applies to the ABA field, as this field is specified by the check format to be zero-filled.

ABA field digit character count errors are detected when a sorting program is set up in the ABA field. Under these circumstances, the ABA field selector switch 87 is closed at the control panel 86 of the sorting mechanism 20, thus opening the "and" gates 167, 173, and 179 in the sorting control system 22. The gate 173 will communicate the output signal of the field digit counter 299, which appears at the terminal designated as "7" of the flip-flop circuit 304 (FIG. 6(d)) to the reset side of the flip-flop circuit 295, since the check format specifies four digits in the ABA field, zero-filled if necessary. Ordinarily, then, the field digit counter 299 will count four digit character-signifying signals and then automatically close the gates 296 and 297 by resetting the flip-flop circuit 295 through the "and" gate 173 and the "or" circuit 184. But, if there should be a digit character-signifying signal missing in this field, the field digit counter 299 will not reach a fourth count before the next or second secondary cue symbol-signifying signal arrives at the gate 297 through the "or" circuit 430 (FIG. 6(a)). This second secondary cue symbol-signifying signal will pass through the "and" gate 179 and the "or" network 401, resulting in actuation of the sorting control cancellation flip-flop circuit 400, causing the check in question to be routed to the reject pocket 132 in the sorting mechanism 20.

Special sorting control accessories

Special zero sorting decisions are made by way of two sets of logical circuits. One set of logical circuits applies to sorting programs in suppressed-zero fields; the other set applies to sorting programs in zero-filled fields. Signals out of these two sets of logical circuits are used to activate the special decision channel in the sorting control system 22. This special decision channel includes the flip-flop circuit 321 (FIG. 6(f)) and is in effect a special zero decision channel for the sorting of checks which have no significant digit characters either in the sorting program digit character field interval or in the intervals of higher order magnitudes remaining in the selected field. These special sorting decisions relieve a sorting machine operator of the burden of making repeated passes of these checks unnecessarily.

A complete sorting of a stack of checks will ultimately divide all the checks between the reject pocket 132 and the special decision or significant zero pocket 129 of the sorting mechanism 20, with the checks in the latter pocket being stacked in a numerical order with respect to the number information present in the selected field. The decimal digit pockets of the sorting mechanism 20 serve as a convenience for chronologically restacking the checks between successive sorting passes in a numerical order with respect to the digital information present in the selected field.

Suppressed-zero field detection

The suppressed-zero field detection accessory applies only to the Branch Number, Account Number, and Transaction No. 1 fields in accordance with the specifications of the illustrated check format.

When the program field selector switches 87 at the control panel 86 are closed for either of these fields, the applicable "and" gates 174, 175, or 176 operate to close the gates 296 and 297 by way of the flip-flop circuit 295. The output of amplifier 317 (FIG. 6(d)), which is a sorting synchronizing signal, initiates this function by being applied to the "and" gates 174 to 176 in coincidence with the program information from the control panel 86. At the same time, the applicable "and" gate 180, 181, or 182 is opened by the actuated program field selector switch 87. Consequently, if the digit character counter 299 does not reach the program count within the interval of the selected field of the check format, the cue symbol-signifying signal terminating the selected field is allowed to pass through the gate 297 (FIG. 6(a)), through the applicable "and" gates 180, 181, or 182, and through the "or" circuit 185 (FIG. 6(c)) to the flip-flop circuit 321 (FIG. 6(f)) in the special decision channel of the sorting control system 22. The check in question will in this case be routed to the special decision pocket 129 of the sorting mechanism 20.

Zero-filled field detection

The zero-filled field detection accessory applies to the ABA and FRD fields in accordance with the specifications of the illustrated check format.

The output of the "and" gate 271 (FIG. 6(f)) is used to trigger a flip-flop circuit 435 (FIG. 6(c)), which in turn opens the "and" gate 436. If there are more significant digit character-signifying signals within the selected field interval, the output from an "or" circuit 437 (FIG. 6(c)) connected so as to receive digit character-signifying signals from the lines 260 to 269 will indicate this, and this output will reset the flip-flop circuit 435, which will in turn close the "and" gate 436.

With the "and" gate 436 closed, the flip-flop circuit 322 (FIG. 6(f)) will not be reset until the first timing control signal is delivered through an "or" circuit 438 (FIG. 6(c)) to it. The check in question will be routed to the zero pocket 130 of the sorting mechanism 20, but, if no more significant digit character-signifying signals appear within the selected field interval, the "and" gate 436 will remain open through the field terminating cue symbol-signifying signal interval, and the cue symbol-signifying signal will be allowed to pass through the "or" circuit 438 to the flip-flop circuit 322 to reset it and cancel the initial sorting control signal. The cue symbol-signifying signal will also pass through the "or" network 185 to the flip-flop circuit 321 in the special decision channel of the sorting control system 22. The check in question will in this case be routed to the special decision pocket 129 in the sorting mechanism 20.

The "and" gates 166 to 171, 172 to 177, 178 to 182, 215 to 228, 271 to 280, 333 to 343, 357 to 367, 399, 416, 426, and 436; the "or" circuits 183 to 185, 244, 298, 315, 396, 401, 417, 421, 237, and 438; the vacuum tube gate circuits 296 and 297; the diode gates 290, 291, 405, 411, and 419; the one-shot multivibrators 368 to 418; the squaring circuits 316 and 397; the reset generators 392 and 395; the amplifiers 317, 318, 381 to 391, 398, and 425; the flip-flop circuits 295, 321 to 331, 345 to 355, 400, 410, 415, 420, and 435; and the counters 281 and 299 are all illustrated in block form in FIGS. 6(a)–6(g). Each of these elements is well known in the art, and the invention is not concerned with the specific circuitry of these elements.

Flip-flop circuits and counters suitable for use in the invention are described in chapters 5 to 11, respectively, of "Pulse and Digital Circuits," by Millman and Taub, McGraw-Hill Book Company, Inc., 1956. Suitable "and" gates and "or" circuits are also described in chapter 13 of the above publication.

A suitable vacum tube gate circuit for use in the invention is one designated Z–90002 in Catalog 827 of the EECO Production Company. And, a suitable one-shot multivibrator, a squaring circuit, and a reset generator are those designated Z–8889, Z–90001, and Z–90020, respectively, also shown in the catalog mentioned above.

While the form of sorting apparatus which is herein shown and described is admirably adapted to fulfill the objects primarily stated, it is to be understood that it is not intended to confine the invention to the one form or embodiment herein disclosed, for it is susceptible of embodiment in various other forms, all coming within the scope and intent of the invention.

What is claimed is:

1. Apparatus for sorting media each having successive areas on which control data is recorded, said apparatus comprising: means for sensing said media individually in sequence to read the control data recorded on said areas in succession to generate electrical signals having characteristics representative of the corresponding control data recorded on each of said areas of said media; an analyzing means coupled to said sensing means for receiving said signals and for providing in response thereto control data-signifying signals indicative of the identity of the control data read; means for selecting, from among all of said control data-signifying signals provided by said analyzing means, a specific control data-signifying signal provided for the control data recorded on a similarly located area of each of said media to provide a synchronizing signal for each of said media; means coupled to said analyzing means and responsive to coincidental occurrence of said synchronizing signal and said specific control data-signifying signal provided by said analyzing means for each of said media to provide a sorting control signal for each of said media; and sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the control data recorded on said similarly located area of each of said media.

2. Apparatus for sorting media each having successive areas on which control data is recorded, said apparatus comprising: means for sensing said media individually in sequence to read the control data recorded on said areas in succession to generate electrical signals having characteristics representative of the corresponding control data recorded on each of said areas of said media; an analyzing means coupled to said sensing means for receiving said signals and for providing in response thereto control data-signifying signals indicative of the identity of the control data read; means for selecting, from among all of said control data-signifying signals provided by said analyzing means, a specific control data-signifying signal provided for the control data recorded on a similarly located area of each of said media to provide a synchronizing signal for each of said media; means responsive to coincidental occurrence of said synchronizing signal and said specific control data-signifying signal provided by said analyzing means for each of said media to provide a sorting control signal for each of said media; and means controlled by said sorting control signals for distributing said media from said sensing means according to the significance of said control data recorded on said similarly located area of each of said media.

3. Apparatus for sorting media each having areas on which control data is recorded, each of said media having a plurality of sorting fields, with each of said sorting fields being composed of a predetermined number of said areas, and with the areas of each sorting field being successively located on said media, said apparatus comprising: means for sensing said media individually in sequence to read the control data of a similarly located sorting field of each of said media in succession to generate electrical signals having characteristics representative of the corresponding control data recorded on each of said areas of said similarly located sorting field of each of said media; an analyzing means coupled to said sensing means for receiving said signals and for providing in response thereto control data-signifying signals indicative of the identity of the control data read; means for selecting, from among all of said control data-signifying signals provided by said analyzing means, a specific control data-signifying signal provided for the control data recorded on a similarly located area of each of said media to provide a synchronizing signal for each of said media; means responsive to coincidental occurrence of said synchronizing signal and said specific control data-signifying signal provided by said analyzing means for each of said media to provide a sorting control signal for each of said media; and sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the control data recorded on said similarly located area of each of said media.

4. Apparatus for sorting media each having successive areas on which control data is recorded, said apparatus comprising: means for sensing said media individually in sequence to read the control data recorded on said areas in succession to generate electrical signals having characteristics representative of the corresponding control data recorded on each of said areas of said media; an analyzing means coupled to said sensing means for receiving said signals and for providing in response thereto control data-signifying signals indicative of the identity of the control data read; means for selecting, from among all of said control data-signifying signals provided by said analyzing means, a specific control data-signifying signal provided for the control data recorded on a similarly located area of each of said media to provide a synchronizing signal for each of said media, said selecting means including a counter coupled to said analyzing means for counting the control data-signifying signals provided by said analyzing means and for producing output signals therefrom, and including means to select one of said output signals applicable to said control data recorded on said similarly located area of each of said media to provide said synchronizing signal for each of said media; means coupled to said analyzing means responsive to coincidental occurrence of said synchronizing signal and said specific control data-signifying signal provided by said analyzing means for each of said media to provide a sorting control signal for each of said media; and means controlled by said sorting control signals for distributing said media from said sensing means according to the significance of said control data recorded on said similarly located area of each of said media.

5. Apparatus for sorting media each having a certain number of successive areas on which control data may be recorded, said apparatus comprising: means for sensing said media individually in sequence to read any control data recorded on said areas in succession to generate electrical signals having characteristics representative of the corresponding control data that may be recorded on each of said areas of said media; an analyzing means coupled to said sensing means for receiving said signals and for providing in response thereto control data-signifying signals indicative of the identity of the control data read; means for selecting from among all of said control data-signifying signals provided by said analyzing means, a specific control data-signifying signal provided for the control data recorded on a similarly located area of each of said media to provide a synchronizing signal for each of said media; means responsive to coincidental occurrence of said suchronizing signal and said specific control data-signifying signal provided by said analyzing means for each of said media to provide a sorting control signal for each of said media; sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of said control data recorded on said similarly located area of each of said media; and means operative when said analyzing means does not provide a number of control data-signifying signals for each of said media equal to said certain number of successive areas to cause said distributing means to distribute such of said media in a common pocket separate from the sorting pockets receiving media distributed thereto under the control of said sorting control signals.

6. Apparatus for sorting media each having successive areas on which control data is recorded, said apparatus comprising: means for sensing said media individually in sequence to read the control data recorded on said areas in succession to generate electrical signals having characteristics representative of the corresponding control data recorded on each of said areas of said media; an analyzing means coupled to said sensing means for receiving said signals and for providing in response thereto control data-signifying signals indicative of the identity of the control data read; means for developing a first control signal for each of said media occurring prior to analysis of said electrical signals generated by said sensing means; means for developing a second control signal for each of said media occurring after termination of analysis of said electrical signals generated by said sensing means; means for developing a third control signal for each of said media occurring just prior to occurrence of each of said second control signals; means for selecting, from among all of said control data-signifying signals provided by said analyzing means, a specific control data-signifying signal provided for the control data recorded on a similarly located area of each of said media to provide a synchronizing signal for each of said media; means responsive to coincidental occurrence of said synchronizing signal and said specific control data-signifying signal provided by said analyzing means for each of said media to provide a sorting control signal for each of said media; first storage means for storing successive ones of said sorting control signals; second storage means for storing successive ones of said sorting control signals read out of said first storage means; means for reading out said sorting control signals from said second storage means under control of said third control signals; means for reading out sorting control signals from said first storage means into said second storage means under control of said second control signals; means for coupling said first control signals to said selecting means to render said selecting means effective; and sorting mechanism including a plurality of sorting pockets and means to distribute said media from said sensing means to said sorting pockets, said sorting mechanism being controlled by said sorting control signals read out from said second storage means to cause said distributing means to distribute said media to certain of said sorting pockets according to the significance of the control data recorded on said similarly located area of each of said media.

7. Apparatus for sorting media each having successive areas on which control data is recorded, said apparatus comprising: means for sensing said media individually in sequence to read the control data recorded on said areas in succession to generate electrical signals having characteristics representative of the corresponding control data recorded on each of said areas of said media; an analyzing means coupled to said sensing means for receiving said signals and for providing in response thereto control data-signifying signals indicative of the identity of the control data read; means for selecting, from among all of said control data-signifying signals provided by said analyzing means, a specific control data-signifying signal provided for the control data recorded on a similarly located area of each of said media to provide a synchronizing signal for each of said media; means responsive to coincidental occurrence of said synchronizing signal and said specific control data-signifying signal provided by said analyzing means for each of said media to provide a sorting control signal for each of said media; storage means for storing successive ones of said sorting control signals; means for developing a control signal for each of said media occurring just prior to termination of analysis of said electrical signals generated by said sensing means; means for reading out said sorting control signals from said storage means under control of said control signals; and sorting mechanism including a plurality of sorting pockets and means to distribute said media from said sensing means to said sorting pockets, said sorting mechanism being controlled by said sorting control signals read out from said storage means to cause said distributing means to distribute said media to certain of said sorting pockets according to the significance of the control data recorded on said similarly located area of each of said media.

8. Apparatus for sorting media each having successive areas on which control data may be recorded, with certain areas having a certain control data recorded thereon serving to separate the remaining areas into a plurality of sorting fields, said apparatus comprising: means for sensing said media individually in sequence to read any control data recorded on said areas in succession to generate electrical signals having characteristics representative of the corresponding control data that may be recorded on each of said areas of said media; an analyzing means coupled to said sensing means for receiving said signals and for providing in response thereto control data-signifying signals indicative of the identity of the control data read; field selector means coupled to said analyzing means for receiving said control data-signifying signals and for selecting therefrom those control data-signifying signals applicable to the control data recorded in a desired sorting field of each of said media, said field selector means including means for selecting one of said control data-signifying signals applicable to said certain control data recorded on one of said certain areas of each of said media, and means utilizing said selected one of said control data-signifying signals to select said control data-signifying signals applicable to said control data recorded in said desired sorting field of each of said media; control data area selector means coupled to said field selector means for selecting, from among all of said control data-signifying signals of said desired sorting field, a specific control data-signifying signal provided for the control data recorded on a similarly located area in said desired sorting field of each of said media to provide a synchronizing signal for each of said media; means coupled to said analyzing means responsive to coincidental occurrence of said synchronizing signal and specific control data-signifying signal provided by said analyzing means for each of said media to provide a sorting control signal for each of said media; and sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the control data recorded on said similarly located areas.

9. Apparatus for sorting media each having successive areas on which control data may be recorded, with certain areas having a certain control data recorded thereon serving to separate the remaining areas into a plurality of sorting fields, said apparatus comprising: means for sensing said media individually in sequence to read any control data recorded on said areas in succession to generate electrical signals having characteristics representative of the corresponding control data that may be recorded on each of said areas of said media; an analyzing means coupled to said sensing means for receiving said signals and for providing in response thereto control data-signifying signals indicative of the identity of the control data read; field selector means coupled to said analyzing means for receiving said control data-signifying signals and for selecting therefrom those control data-signifying signals provided for the control data recorded in a desired sorting field of each of said media, said field selector means including means for selecting one of said control data-signifying signals applicable to said certain control data recorded on one of said certain areas of each of said media and indicative of the start of said desired sorting field, means responsive to said selected control data-signifying signal for producing a gating signal, and a gate coupled to said analyzing means for receiving said control data-signifying signals provided by said analyzing means, said gate being controlled by said gating signal so as to pass control data-signifying signals provided by said analyzing means for said desired sorting field; control data area selector means coupled to said field selector means for selecting, from among all of said control data-signifying signals of said desired sorting field, a specific control data-signifying signal provided for the control data recorded on a similarly located area in said desired sorting field of each of said media to provide a synchronizing signal for each of said media, said control data area selector means including a counter coupled to said gate for counting the control data-signifying signals of said desired sorting field and for providing output signals therefrom, and means to select one of said output signals of said counter applicable to the control data recorded on said similarly located area to provide said synchronizing signal for each of said media; means coupled to said analyzing means responsive to coincidental occurrence of said synchronizing signal and said specific control data-signifying signal provided by said analyzing means for each of said media to provide a sorting control signal for each of said media; and sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the control data recorded on said similarly located areas.

10. Apparatus for sorting media each having successive areas on which control data may be recorded, with certain areas having a certain control data recorded thereon serving to separate the remaining areas into a plurality of sorting fields, and with at least one of said sorting fields being of a type normally requiring that control data be recorded on each area thereof, said apparatus comprising: means for sensing said media individually in sequence to read any control data recorded on said areas in succession to generate electrical signals having characteristics representative of the corresponding control data that may be recorded on each of said areas of said media; an analyzing means coupled to said sensing means for receiving said signals and for providing in response thereto control data-signifying signals indicative of the identity of the control data read; field selector means coupled to said analyzing means for receiving said control data-signifying signals and for selecting therefrom those control data-signifying signals applicable to the control data recorded in a desired sorting field of each of said media, said field selector means including means for selecting one of said control data-signifying signals applicable to said certain control data recorded on one of said certain areas of each of said media, and means utilizing said selected one of said control data-signifying signals to select said control data-signifying signals applicable to the control data recorded in said desired sorting field of each of said media; control data area selector means coupled to said field selector means for selecting, from among all of said control data-signifying signals of said desired sorting field, a specific control data-signifying signal provided for the control data recorded on a similarly located area in said desired sorting field of each of said media to provide a synchronizing signal for each of said media; means coupled to said analyzing means responsive to coincidental occurrence of said synchronizing signal and said specific control data-signifying signal provided by said analyzing means for each of said media to provide a sorting control signal for each of said media; sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the control data recorded on said similarly located areas; means operative when said desired sorting field is said type, and when said specific control data-signifying signal and said control data-signifying signals provided for the remainder of said desired sorting field each have a predetermined significance to control the effect of said sorting control signals and cause said distributing means to distribute such of said media in a first common pocket separate from said sorting pockets receiving media distributed thereto under the control of said sorting control signals; and means operative when said desired sorting field is said type, and when control data-signifying signals are not provided for all of said areas thereof to cause said distributing means to distribute such of said media in a second common pocket separate from said first common pocket and separate from said sorting pockets receiving media distributed thereto under the control of said sorting control signals.

11. Apparatus for sorting media each having successive areas on which control data may be recorded, with certain areas having a certain control data recorded thereon serving to separate the remaining areas into a plurality of sorting fields, and with at least one of said sorting fields being of a type normally requiring that control data be recorded on each area thereof, and with at least another of said sorting fields being of a second type not having such a requirement, said apparatus comprising: means for sensing said media individually in sequence to read the control data recorded on said areas in succession to generate electrical signals having characteristics representative of the corresponding said media; an analyzing means coupled to said sensing means for receiving said signals and for providing in response thereto control data-signifying signals indicative of the identity of the control data read; field selector means coupled to said analyzing means for receiving said control data-signifying signals and for selecting therefrom those control data-signifying signals applicable to the control data recorded in a desired sorting field of each of said media, said field selector means including means for selecting one of said control data-signifying signals applicable to said certain control data recorded on one of said certain areas of each of said media, and means utilizing said selected one of said control data-signifying signals to select said control data-signifying signals applicable to said control data recorded in said desired sorting field of each of said media; control data area selector means coupled to said field selector means for selecting, from among all of said control data-signifying signals of said desired sorting field, a specific control data-signifying signal provided for the control data recorded on a similarly located area in said desired sorting field of each of said media to provide a synchronizing signal for each of said media; means coupled to said analyzing means responsive to coincidental occurrence of said synchronizing signal and said specific control data-signifying signal provided by said analyzing means for each of said media to provide a sorting control signal for each of said media; sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the control data recorded on said similarly located areas; means operative when said desired sorting field is said first type, and when said specific control data-signifying signal and said control data-signifying signals provided for the remainder of said first type sorting field each have a predetermined significance to control the effect of said sorting control signals and cause said distributing means to distribute such of said media in a first common pocket separate from said sorting pockets receiving media distributed thereto under the control of said sorting control signals; and means operative when said desired sorting field is said second type, and when a control data-signifying signal is not provided for said similarly located area of said second type sorting field and for remaining areas thereof to cause said distributing means to distribute such of said media in said common pocket.

12. Apparatus for sorting media each having successive areas on which characters may be recorded, with certain areas having a control character recorded thereon serving to separate the remaining areas on each of which a digit character may be recorded into a plurality of sorting fields, said apparatus comprising: means for sensing said media individually in sequence to read the characters recorded on said areas in sucession to generate electrical signals having characteristics representative of the corresponding digit characters and control characters recorded on said areas of said media; an analyzing means coupled to said sensing means for receiving said signals and for providing in response thereto digit character-signifying signals and control character-signifying signals indicative of the identity of the digit and control characters read; field selector means coupled to said analyzing means for receiving said digit-character-signifying signals and said control character-signifying signals and for selecting therefrom those digit character-signifying signals applicable to the digit characters recorded in a desired sorting field of each of said media, said field selector means including means for selecting one of said control character-signifying signals indicative of the start of said desired sorting field, means responsive to said selected control character-signifying signal for producing a gating signal, and a gate coupled to said analyzing means for receiving said digit character-signifying signals provided by said analyzing means, said gate being controlled by said gating signal so as to pass said digit character-signifying signals provided by said analyzing means for said desired sorting field; digit character area selector means coupled to said field selector means for selecting, from among all of said digit character-signifying signals of said desired sorting field, a specific digit character-signifying signal provided for the digit character recorded on a similarly located area in said desired sorting field of each of said media, said digit character area selector means including a counter coupled to said gate for counting the digit character-signifying signals of said desired sorting field and for producing output signals therefrom, and means to select one of said output signals applicable to said digit character recorded on said similarly located area to provide said synchronizing signal for each of said media; means coupled to said analyzing means responsive to coincidental occurrence of said synchronizing signal and said specific digit character-signifying signal provided by said analyzing means for each of said media to provide a sorting control signal for each of said media; and sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the digit character recorded on said similarly located areas.

13. Apparatus for sorting media each having successive areas on which characters may be recorded, with certain areas having a control character recorded thereon serving to separate the remaining areas on each of which a digit character may be recorded into a plurality of sorting fields, and with a certain control character being recorded more than once on each media, said apparatus comprising: means for sensing said media individually in sequence to read the characters recorded thereon in succession to generate electrical signals having wave-shape characteristics representative of the corresponding digit characters and control characters recorded on said areas of said media; an analyzing means coupled to said sensing means for receiving said signals and for providing in response thereto digit character-signifying signals and control character-signifying signals indicative of the identity of the digit and control characters read; field selector means coupled to said analyzing means for receiving said digit character-signifying signals and said control character-signifying signals and for selecting therefrom those digit character-signifying signals applicable to the digit characters recorded in a desired sorting field of each of said media, said field selector means including a counter coupled to said analyzing means for counting the control character-signifying signals applicable to said certain control characters and for producing output signals therefrom, means to select one of said output signals applicable to the certain control character indicative of the start of said desired sorting field, means responsive to said selected output signal for producing a gating signal, and a gate coupled to said analyzing means for receiving said digit character-signifying signals provided by said analyzing means, said gate being controlled by said gating signal so as to pass said digit character-signifying signals provided by said analyzing means for said desired sorting field; digit character area selector means coupled to said field selector means for selecting, from among all of said digit character-signifying signals of said desired sorting field, a specific digit character-signifying signal provided for the digit character recorded on a similarly located area in said desired sorting field of each of said media to provide a synchronizing signal for each of said media, said digit character area selector means including a counter coupled to said gate for counting the digit character-signifying signals of said desired sorting field and for producing output signals therefrom, and means to select one of said output signals applicable to said digit character recorded on said similarly located area to provide said synchronizing signal for each of said media; means coupled to said analyzing means responsive to coincidental occurrence of said synchronizing signal and said specific digit character-signifying signal provided by said analyzing means for each of said media to provide a sorting control signal for each of said media; and sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the digit character recorded on said similarly located areas.

14. Apparatus for sorting media each having successive areas on which characters may be recorded, with certain areas each having a control character recorded thereon serving to separate the remaining areas on each of which a digit character may be recorded into a plurality of sorting fields, with at least one of said sorting fields being of a first type normally requiring that a digit character be recorded on each area thereof and with at least another of said sorting fields being of a second type not having such a requirement, said apparatus comprising: means for sensing said media individually in sequence to read the characters recorded thereon in succession to generate electrical signals having wave-shape characteristics representative of the corresponding digit characters and control characters recorded on said areas of said media; an analyzing means coupled to said sensing means for receiving said signals and for providing in response thereto digit character-signifying signals and control character-signifying signals indicative of the identity of the digit and control characters read; field selector means coupled to said analyzing means for receiving said digit character-signifying signals and said control character-signifying signals and for selecting therefrom those digit character-signifying signals applicable to the digit characters recorded in a desired sorting field of each of said media, said field selector means including means for selecting one of said control character-signifying signals indicative of the start of said desired sorting field, means responsive to said selected control character-signifying signal for producing a gating signal, and a gate coupled to said analyzing means for receiving said digit character-signifying signals provided by said analyzing means, said gate being controlled by said gating signal so as to pass said digit character-signifying signals provided by said analyzing means for said desired sorting field; digit character area selector means coupled to said field selector means for selecting, from among all of said digit character-signifying signals of said desired sorting field, a specific digit character-signifying signal provided for the digit character recorded on a similarly located area in said desired sorting field of each of said media to provide a synchronizing signal for each of said media, said digit character area selector means including a counter coupled to said gate for counting the digit character-signifying signals of said desired sorting field and for producing output signals therefrom, and means to select one of said output signals applicable to the digit character recorded on said similarly located area to provide said synchronizing signal for each of said media; means coupled to said analyzing means responsive to coincidental occurrence of said synchronizing signal and said specific digit character-signifying signal provided by said analyzing means for each of said media to provide a sorting control signal for each of said media; sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the digit character recorded on said similarly located areas; means operative when said desired sorting field is said first type, and when said specific digit character-signifying signal and said digit character-signifying signals provided for the remainder of said first type sorting field each have zero significance to control the effect of said sorting control signals and cause said distributing means to distribute such of said media to a common pocket separate from said sorting pockets receiving media distributed thereto under the control of said sorting control signals; and means operative when said desired sorting field is said second type, and when digit character-signifying signals are not provided for said similarly located area of said second type sorting field and for remaining areas thereof to cause said distributing means to distribute such of said media in said common pocket.

15. Apparatus for sorting media each having successive areas on which characters may be recorded, with certain areas each having a control character recorded thereon serving to separate the remaining areas, on each of which a digit character may be recorded into a plurality of sorting fields, and with at least one of said sorting fields being of a type normally requiring that a digit character be recorded on each area thereof, said apparatus comprising: means for sensing said media individually in sequence to read the characters recorded thereon in succession to generate electrical signals having wave-shape characteristics representative of the corresponding digit characters and control characters recorded on said areas of said media; an analyzing means coupled to said sensing means for receiving said signals and for providing in response thereto digit character-signifying signals and control character-signifying signals indicative of the identity of the digit and control characters read; field selector means coupled to said analyzing means for receiving said digit character-signifying signals and said control character-signifying signals and for selecting therefrom those digit character-signifying signals applicable to the digit characters recorded in a desired sorting field of each of said media, said field selector means including means for selecting one of said control character-signifying signals indicative of the start of said desired sorting field, means responsive to said selected control character-signifying signal for producing a gating signal, and a gate coupled to said analyzing means for receiving said digit character-signifying signals provided by said analyzing means, said gate being controlled by said gating signal so as to pass said digit character-signifying signals provided by said analyzing means for said desired sorting field; digit character area selector means coupled to said field selector means for selecting, from among all of said digit character-signifying signals of said desired sorting field, a specific digit character-signifying signal provided for the digit character recorded on a similarly located area in said desired sorting field of each of said media to provide a synchronizing signal for each of said media, said digit character area selector means including a counter coupled to said gate for counting the digit character-signifying signals of said desired sorting field and for producing output signals therefrom, and means to select one of said output signals applicable to the digit character recorded on said similarly located area to provide said synchronizing signal for each of said media; means coupled to said analyzing means responsive to coincidental occurrence of said synchronizing signal and said specific digit character-signifying signal provided by said analyzing means for each of said media to provide a sorting control signal for each of said media; sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the digit character recorded on said similarly located areas; means operative when said desired sorting field is said type, and when said specific digit character-signifying signal and said digit character-signifying signals provided for the remainder of said desired type sorting field each have zero significance to control the effect of said sorting control signals and cause said distributing means to distribute such of said media to a first common pocket separate from said sorting pockets receiving media distributed thereto under the control of said sorting control signals; and means operative when said desired sorting field is said type, and when digit character-signifying signals are not provided for all of said areas thereof to cause said distributing means to distribute such of said media to a second common pocket separate from said first common pocket and from said sorting pockets receiving media distributed thereto under the control of said sorting control signals.

16. Apparatus for sorting media each having successive areas on which characters may be recorded, with certain areas each having a control character recorded thereon serving to separate the remaining areas on each of which a digit character may be recorded into a plurality of sorting fields, with at least one of said sorting fields being of a type normally requiring that a digit character be recorded on each area thereof and with at least another of said sorting fields being of a second type not having such a requirement, said apparatus comprising: means for sensing said media individually in sequence to read the characters recorded thereon in succession to generate electrical signals having wave-shape characteristics representative of the corresponding digit characters and control characters recorded on said areas of said media; an analyzing means coupled to said sensing means for receiving said signals and for providing in response thereto digit character-signifying signals and control character-signifying signals indicative of the identity of the digit and control characters read; field selector means coupled to said analyzing means for receiving said digit character-signifying signals and said control character-signifying signals and for selecting therefrom those digit character-signifying signals applicable to the digit characters recorded in a desired sorting field of each of said media, said field selector means including means for selecting one of said control character-signifying signals indicative of the start of said desired sorting field, means responsive to said selected control character-signifying signal for producing a gating signal, and a gate coupled to said analyzing means for receiving said digit character-signifying signals provided by said analyzing means, said gate being controlled by said gating signal so as to pass said digit character-signifying signals provided by said analyzing means for said desired sorting field; digit character area selector means coupled to said field selector means for selecting, from among all of said digit character-signifying signals of said desired sorting field, a specific digit character-signifying signal provided for the digit character recorded on a similarly located area in said desired sorting field of each of said media to provide a synchronizing signal for each of said media, said digit character area selector means including a counter coupled to said gate for counting the digit character-signifying signals of said desired sorting field and for producing output signals therefrom, and means to select one of said output signals applicable to said digit character recorded on said similarly located area to provide said synchronizing signal for each of said media; means coupled to said analyzing means responsive to coincidental occurrence of said synchronizing signal and said specific digit character-signifying signal provided by said analyzing means for each of said media to provide a sorting control signal for each of said media; sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the digit character recorded on said similarly located areas; means operative when said desired sorting field is said first type, and when said specific digit character-signifying signal and said digit character-signifying signals provided for the remainder of said desired type sorting field each have zero significance to control the effect of said sorting control signals and cause said distributing means to distribute such of said media to a first common pocket separate from said sorting pockets receiving media distributed thereto under the control of said sorting control signals; means operative when said desired sorting field is said second type, and when digit character-signifying signals are not provided for said similarly located areas of said second type sorting field and for remaining areas thereof to cause said distributing means to distribute such of said media in said first common pocket; and means operative when said desired sorting field is said first type, and when digit character-signifying signals are not provided for all of said areas thereof, to cause said distributing means to distribute such of said media to a second common pocket separate from said first common pocket and from said sorting pockets receiving media distributed thereto under the control of said sorting control signals.

17. Apparatus for sorting media each having successive areas on which characters may be recorded, with certain areas having a control character recorded thereon serving to separate the remaining areas on each of which a digit character may be recorded into a plurality of sorting fields, at least one of said sorting fields being of a type normally requiring that a digit character be recorded at each area thereof, said apparatus comprising: means for sensing said media individually in sequence to read the characters recorded thereon in succession to generate electrical signals having wave-shape characteristics representative of the corresponding digit characters and control characters recorded on said areas of said media; an analyzing means coupled to said sensing means for receiving said signals and for providing in response thereto digit character-signifying signals and control character-signifying signals indicative of the identity of the digit and control characters read; field selector means coupled to said analyzing means for receiving said digit character-signifying signals and said control character-signifying signals and for selecting therefrom those digit character-signifying signals applicable to the digit characters recorded in a desired sorting field of each of said media, said field selector means including means for selecting one of said control character-signifying signals indicative of the start of said desired sorting field, means responsive to said selected control character-signifying signal for producing a gating signal, and a gate coupled to said analyzing means for receiving said digit character-signifying signals provided by said analyzing means, said gate being controlled by said gating signal so as to pass said digit character-signifying signals provided by said analyzing means for said desired sorting field; digit character area selector means coupled to said field selector means for selecting, from among all of said digit character-signifying signals of said desired sorting field, a specific digit character-signifying signal provided for the digit character recorded on a similarly located area in said desired sorting field of each of said media to provide a synchronizing signal for each of said media, said digit character area selector means including a counter coupled to said gate for counting the digit character-signifying signals of said desired sorting field and for producing output signals therefrom, and means to select one of said output signals applicable to said digit character recorded on said similarly located area to provide said synchronizing signal for each of said media; means coupled to said analyzing means responsive to coincidental occurrence of said synchronizing signal and said specific digit character-signifying signal provided by said analyzing means for each of said media to provide a sorting control signal for each of said media; sorting mechanism including a plurality of sorting pockets and means to distribute said media from said sensing means to said sorting pockets, said sorting mechanism being controlled by said distributing means to distribute said media to certain of said sorting pockets according to the significance of the digit character recorded on said similarly located areas; and means operative when said desired sorting field is said type, and when digit character-signifying signals are not provided for all of said areas thereof, to cause said distributing means to distribute such of said media to a common pocket separate from said sorting pockets receiving media distributed thereto under the control of said sorting control signals.

18. Apparatus for sorting media each having successive areas on which characters may be recorded, with certain areas having a control character recorded thereon serving to separate the remaining areas on each of which a digit character may be recorded into a plurality of sorting fields, at least one of said sorting fields being of a type normally requiring that a digit character be recorded on each area thereof, said apparatus comprising: means for sensing said media individually in sequence to read the characters recorded thereon in succession to generate electrical signals having wave-shape characteristics representative of the corresponding digit characters and control characters recorded on said areas of said media; an analyzing means coupled to said sensing means for receiving said signals and for providing in response thereto digit character-signifying signals and control character-signifying signals indicative of the identity of the digit and control characters read; field selector means coupled to said analyzing means for receiving said digit character-signifying signals and said control character-signifying signals and for selecting therefrom those digit character-signifying signals applicable to the digit characters recorded in a desired sorting field of each of said media, said field selector means including means for selecting one of said control character-signifying signals indicative of the start of said desired sorting field, means responsive to said selected control character-signifying signal for producing a gating signal, and a gate coupled to said analyzing means for receiving said digit character-signifying signals provided by said analyzing means, said gate being controlled by said gating signal so as to pass said digit character-signifying signals provided by said analyzing means for said desired sorting field; digit character area selector means coupled to said field selector means for selecting, from among all of said digit character-signifying signals of said desired sorting field, a specific digit character-signifying signal provided for the digit character recorded on a similarly located area in said desired sorting field of each of said media to provide a synchronizing signal for each of said media, said digit character area selector means including a counter coupled to said gate for counting the digit character-signifying signals of said desired sorting field and for producing output signals therefrom, and means to select one of said output signals applicable to said digit character recorded on said similarly located area to provide said synchronizing signal for each of said media; sorting mechanism including a plurality of sorting pockets and means to distribute said media from said sensing means to said sorting pockets, said sorting mechanism being controlled by said distributing means to distribute said media to certain of said sorting pockets according to the significance of the digit character recorded on said similarly located areas; and means operative when said desired sorting field is said type, and when said specific digit character-signifying signal and said digit character-signifying signals provided for the remainder of said desired type sorting field each have zero significance to control the effect of said sorting control signals and cause said distributing means to distribute such of said media to a common pocket separate from said sorting pockets receiving media distributed thereto under the control of said sorting control signals.

19. Apparatus for sorting media each having successive areas on which characters may be recorded, with certain areas having a control character recorded thereon serving to separate the remaining areas on each of which a digit character may be recorded into a plurality of sorting fields, said apparatus comprising: means for sensing said media individually in sequence to read the characters recorded thereon in succession to generate electrical signals having wave-shape characteristics representative of the corresponding digit characters and control characters recorded on said areas of said media; an analyzing means coupled to said sensing means for receiving said signals and for providing in response thereto digit character-signifying signals and control character-signifying signals indicative of the identity of the digit and control characters read; field selector means coupled to said analyzing means for receiving said digit character-signifying signals and said control character-signifying signals and for selecting therefrom those digit character-signifying signals applicable to the digit characters recorded in a desired sorting field of each of said media, said field selector means including means for selecting one of said control character-signifying signals indicative of the start of said desired sorting field, means responsive to said selected control character-signifying signal for producing a gating signal, and a gate coupled to said analyzing means for receiving said digit character-signifying signals provided by said analyzing means, said gate being controlled by said gating signal so as to pass said digit character-signifying signals provided by said analyzing means for said desired sorting field; digit character area selector means coupled to said field selector means for selecting, from among all of said digit character-signifying signals of said desired sorting field, a specific digit character-signifying signal provided for the digit character recorded on a similarly located area in said desired sorting field of each of said media to provide a synchronizing signal for each of said media, said digit character area selector means including a counter coupled to said gate for counting the digit character-signifying signals of said desired sorting field and for producing output signals therefrom, and means to select one of said output signals applicable to said digit character recorded on said similarly located area to provide said synchronizing signal for each of said media; means coupled to said analyzing means responsive to coincidental occurrence of said synchronizing signal and said specific digit character-signifying signal provided by said analyzing means for each of said media to provide a sorting control signal for each of said media; sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the digit character recorded on said similarly located areas; and means operative when digit character-signifying signals are not provided for said similarly located area of each of said media and for remaining areas of said desired sorting field to cause said distributing means to distribute such of said media to a common pocket separate from said sorting pockets receiving media distributed thereto under the control of said sorting control signals.

20. Apparatus for sorting media each having successive areas on which characters may be recorded, with certain areas having a control character recorded thereon serving to separate the remaining areas on each of which a digit character may be recorded into a plurality of fields, and with at least one of said fields being of a type normally requiring that a digit character be recorded on each area thereof, said apparatus comprising: means for sensing said media individually in sequence to read the characters recorded thereon in succession to generate electrical signals having wave-shape characteristics representative of the corresponding digit characters and control characters recorded on said areas of said media; an analyzing means coupled to said sensing means for receiving said signals and for providing in response thereto digit character-signifying signals and control character-signifying signals indicative of the identity of the digit and control characters read; field selector means coupled to said analyzing means for receiving said digit character-signifying signals and said control character-signifying signals and for selecting therefrom those digit character-signifying signals applicable to the digit characters recorded in a desired sorting field of each of said media, said field selector means including means for selecting one of said control character-signifying signals indicative of the start of said desired sorting field, means responsive to said selected control character-signifying signal for producing a gating signal, and a gate coupled to said analyzing means for receiving said digit character-signifying signals provided by said analyzing means, said gate being controlled by said gating signal so as to pass said digit character-signifying signals provided by said analyzing means for said desired sorting field; digit character area selector means coupled to said field selector means for selecting, from among all of said digit character-signifying signals of said desired sorting field, a specific digit character-signifying signal provided for the digit character recorded on a similarly located area in said desired sorting field of each of said media to provide a synchronizing signal for each of said media, said digit character area selector means including a counter coupled to said gate for counting the digit character-signifying signals of said desired sorting field and for producing output signals therefrom, and means to select one of said output signals applicable to said digit character recorded on said similarly located area to provide said synchronizing signal for each of said media; means coupled to said analyzing means responsive to coincidental occurrence of said synchronizing signal and said specific digit character-signifying signal provided by said analyzing means for each of said media to provide a sorting control signal for each of said media; sorting mechanism including a plurality of sorting pockets and means to distribute said media from said sensing means to said sorting pockets, said sorting mechanism being controlled by said sorting control signals to cause said distributing means to distribute said media to certain of said sorting pockets according to the significance of the digit character recorded on said similarly located areas; and means operative when digit character-signifying signals are not provided for all of said areas of said one field to cause said distributing means to distribute such of said media in a common pocket separate from said sorting pockets receiving media distributed thereto under the control of said sorting control signals.

21. Apparatus for sorting media each having successive areas on which characters may be recorded, with certain areas having a control character recorded thereon serving to separate the remaining areas on each of which a digit character may be recorded into a plurality of sorting fields, said apparatus comprising: means for sensing said media individually in sequence to read the characters recorded thereon in succession to generate electrical signals having characteristics representative of the corresponding digit characters and control characters recorded on said areas of said media; an analyzing means coupled to said sensing means for receiving said signals and for providing in response thereto digit character-signifying signals and control character-signifying signals indicative of the identity of the digit and control characters read; means for developing a first control signal for each of said media occurring prior to analysis of said electrical signals generated by said sensing means; means for developing a second control signal for each of said media occurring after termination of analysis of said electrical signals generated by said sensing means; means for developing a third control signal for each of said media occurring just prior to occurrence of each of said second control signals; field selector means coupled to said analyzing means for receiving said digit character-signifying signals and said control character-signifying signals and for selecting therefrom those digit character-signifying signals applicable to the digit characters recorded in a desired sorting field of each of said media, said field selector means including means for selecting one of said control character-signifying signals indicative of the start of said desired sorting field, means responsive to said selected control character-signifying signal for producing a gating signal, and a gate coupled to said analyzing means for receiving said digit character-signifying signals provided by said analyzing means, said gate being controlled by said gating signal so as to pass said digit character-signifying signals provided by said analyzing means for said desired sorting field; digit character area selector means coupled to said field selector for selecting, from among all of said digit character-signifying signals of said desired sorting field, a specific digit character-signifying signal provided for the digit character recorded on a similarly located area in said desired sorting field of each of said media to provide a synchronizing signal for each of said media, said digit character area selector means including a counter coupled to said gate for counting the digit character-signifying signals of said desired sorting field and for producing output signals therefrom, and means to select one of said output signals applicable to the digit character recorded on said similarly located area to provide said synchronizing signal for each of said media; means coupled to said analyzing means responsive to coincidental occurrence of said synchronizing signal and said specific digit character-signifying signal provided by said analyzing means for each of said media to provide a sorting control signal for each of said media; first storage means for storing successive ones of said sorting control signals; second storage means for storing successive ones of said sorting control signals read out of said first storage means; means for reading out said sorting control signals from said second storage means under control of said third control signals; means for reading out said sorting control signals from said first storage means into said second storage means under control of said second control signals; means for coupling said first control signals to said digit character area selector means to render that selector means effective; and sorting mechanism including a plurality of sorting pockets and means to distribute said media from said sensing means to said sorting pockets, said sorting mechanism being controlled by said sorting control signals read out from said second storage means for distributing said media to certain of said sorting pockets according to the significance of the digit characters recorded on said similarly located areas of each of said media.

22. Apparatus for sorting media each having successive areas on which characters may be recorded, with certain areas having a control character recorded thereon serving to separate the remaining areas on each of which a digit character may be recorded into a plurality of sorting fields, said apparatus comprising: means for sensing said media individually in sequence to read the characters recorded thereon in succession to generate electrical signals having characteristics representative of the corresponding digit characters and control characters recorded on said areas of said media; an analyzing means coupled to said sensing means for receiving said signals and for providing in response thereto digit character-signifying signals and control character-signifying signals indicative of the identity of the digit and control characters read; field selector means coupled to said analyzing means for receiving said digit character-signifying signals and said control character-signifying signals and for selecting therefrom those digit character-signifying signals applicable to the digit characters recorded in a desired sorting field of each of said media, said field selector means including means for selecting one of said control character-signifying signals indicative of the start of said desired sorting field, means responsive to said selected control character-signifying signal for producing a gating signal, and a gate coupled to said analyzing means for receiving said digit character-signifying signals provided by said analyzing means, said gate being controlled by said gating signal so as to pass said digit character-signifying signals provided by said analyzing means for said desired sorting field; digit character area selector means coupled to said field selector means for selecting, from among all of said digit character-signifying signals of said desired sorting field, a specific digit character-signifying signal provided for the digit character recorded on a similarly located area in said desired sorting field of each of said media to provide a synchronizing signal for each of said media, said digit character area selector means including a counter coupled to said gate for counting the digit character-signifying signals of said desired sorting field and for producing output signals therefrom, and means to select one of said output signals applicable to the digit character recorded on said similarly located area to provide said synchronizing signal for each of said media; means coupled to said analyzing means responsive to coincidental occurrence of said synchronizing signal and said specific digit character-signifying signal provided by said analyzing means for each of said media to provide a sorting control signal for each of said media; storage means for storing successive ones of said sorting control signals; means for developing a control signal for each of said media; means for reading out said sorting control signals from said storage means under control of said control signal; and sorting mechanism including a plurality of sorting pockets and means to distribute said media from said sensing means to said sorting pockets, said sorting mechanism being controlled by said sorting control signals read out from said second storage means for distributing said media to certain of said sorting pockets according to the significance of the digit characters recorded on said similarly located areas of each of said media.

References Cited in the file of this patent

UNITED STATES PATENTS

| | | |
|---|---|---|
| 2,540,654 | Cohen et al. | Feb. 6, 1951 |
| 2,592,202 | Smith | Apr. 8, 1952 |
| 2,624,786 | Potter | Jan. 6, 1953 |
| 2,749,533 | Daniels | June 5, 1956 |
| 2,784,392 | Chaimowicz | Mar. 5, 1957 |
| 2,795,328 | Tyler et al. | June 11, 1957 |
| 2,804,974 | Noon | Sept. 3, 1957 |

FOREIGN PATENTS

| | | |
|---|---|---|
| 740,656 | Great Britain | Nov. 16, 1953 |
| 1,109,452 | France | Sept. 28, 1955 |

OTHER REFERENCES

Photo-electric Reader Feeds Business Machines by Shepard & Heasly, Jr., Electronics, May 1955, pp. 134–138.

Magnetic Reader Speeds Travelers-Check Processing by Eldridge et al. Control Engineering, July 1958, pp. 79–83.

Electronic Reader Sorts Mail by Tersoff Electronic Industries, July 1958, pp. 56–60.

UNITED STATES PATENT OFFICE
CERTIFICATE OF CORRECTION

Patent No. 2,994,428                                August 1, 1961

Allen W. Daubendick

It is hereby certified that error appears in the above numbered patent requiring correction and that the said Letters Patent should read as corrected below.

Column 9, line 66, for "System" read -- Systems --; column 14, line 69, for "aplied" read -- applied --; column 15, line 2, for "aplicable" read -- applicable --; column 16, line 16, for "applicablt" read -- applicable --; column 22, line 73, after "selecting" insert a comma; column 26, line 52, after "corresponding" insert -- control data that may be recorded on each of said areas of --.

Signed and sealed this 5th day of December 1961.

(SEAL)
Attest:

ERNEST W. SWIDER
Attesting Officer

DAVID L. LADD
Commissioner of Patents

USCOMM-DC